(«12») United States Patent
Rodriguez et al.

(10) Patent No.: US 9,819,899 B2
(45) Date of Patent: *Nov. 14, 2017

(54) SIGNALING TIER INFORMATION TO ASSIST MMCO STREAM MANIPULATION

(71) Applicants: Arturo A. Rodriguez, Norcross, GA (US); Benjamin M. Cook, Flowery Branch, GA (US)

(72) Inventors: Arturo A. Rodriguez, Norcross, GA (US); Benjamin M. Cook, Flowery Branch, GA (US)

(73) Assignee: Cisco Technology, Inc., San Jose, CA (US)

(*) Notice: Subject to any disclaimer, the term of this patent is extended or adjusted under 35 U.S.C. 154(b) by 277 days.

This patent is subject to a terminal disclaimer.

(21) Appl. No.: 14/501,905

(22) Filed: Sep. 30, 2014

(65) Prior Publication Data

US 2015/0016806 A1    Jan. 15, 2015

Related U.S. Application Data

(63) Continuation of application No. 12/483,925, filed on Jun. 12, 2009, now Pat. No. 8,886,022.

(Continued)

(51) Int. Cl.
*H04N 5/783* (2006.01)
*H04N 5/76* (2006.01)
*H04N 5/765* (2006.01)
*H04N 5/781* (2006.01)
*H04N 21/234* (2011.01)
(Continued)

(52) U.S. Cl.
CPC ............. *H04N 5/783* (2013.01); *H04N 5/76* (2013.01); *H04N 5/765* (2013.01); *H04N 5/781* (2013.01); *H04N 21/23418* (2013.01);

*H04N 21/4325* (2013.01); *H04N 21/44008* (2013.01); *H04N 21/8451* (2013.01); *H04N 21/8455* (2013.01);
(Continued)

(58) Field of Classification Search
CPC .... H04N 5/76; H04N 5/783; H04N 21/23418; H04N 21/8455; H04N 21/8451
USPC .......................................................... 386/343
See application file for complete search history.

(56) References Cited

U.S. PATENT DOCUMENTS 4,764,805 A    8/1988  Rabbani et al.
5,440,345 A    8/1995  Shimoda
(Continued)

FOREIGN PATENT DOCUMENTS

CA    2 693 389    6/2014
CN    101129066    2/2008
(Continued)

OTHER PUBLICATIONS

U.S. Office Action dated Nov. 25, 2015 in U.S. Appl. No. 12/252,632, 26 pgs.

(Continued)

*Primary Examiner* — Thai Tran
*Assistant Examiner* — Jose Mesa
(74) *Attorney, Agent, or Firm* — Merchant & Gould P.C.

(57) ABSTRACT

In one embodiment, a method that provides tier information corresponding to a picture, the tier information provided in an adaptation field of a transport packet, the transport packet comprising a first byte of a header of a packetized elementary stream (PES) containing the picture; and provides the first transport packet.

20 Claims, 13 Drawing Sheets

Related U.S. Application Data

(60) Provisional application No. 61/061,057, filed on Jun. 12, 2008.

(51) Int. Cl.
*H04N 21/432* (2011.01)
*H04N 21/44* (2011.01)
*H04N 21/845* (2011.01)
*H04N 5/91* (2006.01)
*H04N 9/79* (2006.01)
*H04N 9/82* (2006.01)

(52) U.S. Cl.
CPC .............. *H04N 5/91* (2013.01); *H04N 9/7921* (2013.01); *H04N 9/8205* (2013.01)

(56) References Cited

U.S. PATENT DOCUMENTS

| | | |
|---|---|---|
| 5,606,359 A | 2/1997 | Youden |
| 5,734,443 A | 3/1998 | O'Grady |
| 5,734,783 A | 3/1998 | Shimoda |
| 5,828,370 A | 10/1998 | Moeller et al. |
| 5,854,873 A | 12/1998 | Mori et al. |
| 5,917,830 A | 6/1999 | Chen et al. |
| 5,917,988 A | 6/1999 | Eto |
| 5,943,447 A | 8/1999 | Tkhor et al. |
| 5,949,948 A | 9/1999 | Krause et al. |
| 5,963,260 A | 10/1999 | Bakhmutsky |
| 5,970,028 A | 10/1999 | Shimabukuro |
| 6,038,000 A | 3/2000 | Hurst, Jr. |
| 6,137,834 A | 10/2000 | Wine et al. |
| 6,144,375 A | 11/2000 | Jain et al. |
| 6,160,889 A | 12/2000 | Yagasaki |
| 6,188,436 B1 | 2/2001 | Williams et al. |
| 6,201,927 B1 | 3/2001 | Commer |
| 6,222,979 B1 | 4/2001 | Willis et al. |
| 6,263,022 B1 | 7/2001 | Chen et al. |
| 6,304,714 B1 | 10/2001 | Krause |
| 6,310,915 B1 | 10/2001 | Wells et al. |
| 6,393,057 B1 | 5/2002 | Thoreau et al. |
| 6,411,725 B1 | 6/2002 | Rhoads |
| 6,421,387 B1 | 7/2002 | Rhee |
| 6,453,115 B1 | 9/2002 | Boyle |
| 6,512,552 B1 | 1/2003 | Subramanian |
| 6,587,506 B1 | 7/2003 | Noridomi et al. |
| 6,608,933 B1 | 8/2003 | Dowell |
| 6,643,327 B1 | 11/2003 | Wang |
| 6,658,199 B1 | 12/2003 | Hallberg |
| 6,678,332 B1 | 1/2004 | Gardere |
| 6,754,373 B1 | 6/2004 | de Cuetos et al. |
| 6,763,390 B1 | 7/2004 | Kovacevic |
| 6,785,289 B1 | 8/2004 | Ward et al. |
| 6,806,909 B1 | 10/2004 | Radha et al. |
| 6,906,743 B1 | 6/2005 | Maurer |
| 6,907,075 B2 | 6/2005 | Felts et al. |
| 6,909,743 B1 | 6/2005 | Ward et al. |
| 6,912,251 B1 | 6/2005 | Ward et al. |
| 6,980,594 B2 | 12/2005 | Wang et al. |
| 6,993,081 B1 | 1/2006 | Brunheroto et al. |
| 6,999,424 B1 | 2/2006 | Kovacevic et al. |
| 7,027,713 B1 | 4/2006 | Hallberg |
| 7,050,603 B2 | 5/2006 | Rhoads |
| 7,053,874 B2 | 5/2006 | Koyama |
| 7,085,322 B2 | 8/2006 | Ngai et al. |
| 7,085,381 B2 | 8/2006 | Kubota et al. |
| 7,085,424 B2 | 8/2006 | Kajiki et al. |
| 7,095,783 B1 | 8/2006 | Sotheran et al. |
| 7,096,481 B1 | 8/2006 | Forecast et al. |
| 7,113,523 B1 | 9/2006 | Kubota et al. |
| 7,129,962 B1 | 10/2006 | Cote et al. |
| 7,185,018 B2 | 2/2007 | Archbold |
| 7,224,730 B2 | 5/2007 | Kim et al. |
| 7,236,520 B2 | 6/2007 | Kim et al. |
| 7,239,801 B2 | 7/2007 | Himeno et al. |
| 7,243,193 B2 | 7/2007 | Walmsley |
| 7,317,839 B2 | 1/2008 | Holcomb |
| 7,376,335 B2 | 5/2008 | De Haan |
| 7,397,858 B2 | 7/2008 | Garrido et al. |
| 7,443,889 B2 | 10/2008 | Gonguet et al. |
| 7,467,297 B2 | 12/2008 | Ji et al. |
| 7,480,335 B2 | 1/2009 | Payson |
| 7,577,198 B2 | 8/2009 | Holcomb |
| 7,584,495 B2 | 9/2009 | Hannuksela et al. |
| 7,586,924 B2 | 9/2009 | Wiegand |
| 7,590,180 B2 | 9/2009 | Kang |
| 7,599,435 B2 | 10/2009 | Marpe et al. |
| 7,599,438 B2 | 10/2009 | Holcomb |
| 7,606,308 B2 | 10/2009 | Holcomb |
| 7,616,692 B2 | 11/2009 | Holcomb |
| 7,620,106 B2 | 11/2009 | Holcomb |
| 7,623,574 B2 | 11/2009 | Holcomb |
| 7,649,937 B2 | 1/2010 | Rabenold et al. |
| 7,656,410 B2 | 2/2010 | Chiu |
| 7,720,145 B2 | 5/2010 | Muthukrishnan et al. |
| 7,733,910 B2 | 6/2010 | Mace et al. |
| 7,733,956 B1 | 6/2010 | Kalra et al. |
| 7,751,324 B2 | 7/2010 | Vadakital et al. |
| 7,793,329 B2 | 9/2010 | Joshi et al. |
| 7,809,059 B2 | 10/2010 | Yin et al. |
| 7,809,060 B2 | 10/2010 | Toma et al. |
| 7,889,788 B2 * | 2/2011 | Toma ................ G11B 27/005 375/240 |
| 7,903,743 B2 | 3/2011 | Ho |
| 7,912,219 B1 | 3/2011 | Michener et al. |
| 8,102,406 B2 | 1/2012 | Peleg et al. |
| 8,136,140 B2 | 3/2012 | Hodge |
| 8,155,207 B2 | 4/2012 | Rodriguez et al. |
| 8,218,651 B1 | 7/2012 | Eshet et al. |
| 8,254,446 B2 | 8/2012 | Toma et al. |
| 8,259,814 B2 | 9/2012 | Rodriguez et al. |
| 8,259,817 B2 | 9/2012 | Rodriguez et al. |
| 8,265,154 B2 | 9/2012 | Gardner |
| 8,279,926 B2 | 10/2012 | Rodriguez et al. |
| 8,320,465 B2 | 11/2012 | Rodriguez et al. |
| 8,326,131 B2 | 12/2012 | Rodriguez |
| 8,416,858 B2 | 4/2013 | Rodriguez et al. |
| 8,416,859 B2 | 4/2013 | Rodriguez et al. |
| 8,681,876 B2 | 3/2014 | Rodriguez et al. |
| 8,699,578 B2 | 4/2014 | Rodriguez et al. |
| 8,705,631 B2 | 4/2014 | Shepherd et al. |
| 8,718,388 B2 | 5/2014 | Rodriguez et al. |
| 8,761,266 B2 | 6/2014 | Rodriguez et al. |
| 8,782,261 B1 | 7/2014 | Rodriguez et al. |
| 8,804,843 B2 | 8/2014 | Rodriguez et al. |
| 8,804,845 B2 | 8/2014 | Rodriguez et al. |
| 8,873,932 B2 | 10/2014 | Rodriguez et al. |
| 8,875,199 B2 | 10/2014 | Rodriguez et al. |
| 8,886,022 B2 | 11/2014 | Rodriguez et al. |
| 8,949,883 B2 | 2/2015 | Rodriguez et al. |
| 8,958,486 B2 | 2/2015 | Rodriguez et al. |
| 8,971,402 B2 | 3/2015 | Rodriguez et al. |
| 9,350,999 B2 | 5/2016 | Rodriguez et al. |
| 9,407,935 B2 | 8/2016 | Rodriguez et al. |
| 9,467,696 B2 | 10/2016 | Rodriguez et al. |
| 9,521,420 B2 | 12/2016 | Rodriguez et al. |
| 9,609,039 B2 | 3/2017 | Rodriguez et al. |
| 9,716,883 B2 | 7/2017 | Rodriguez et al. |
| 9,723,333 B2 | 8/2017 | Rodriguez et al. |
| 2001/0036355 A1 | 11/2001 | Kelly et al. |
| 2002/0071485 A1 | 6/2002 | Caglar et al. |
| 2002/0075402 A1 | 6/2002 | Robson et al. |
| 2002/0092017 A1 | 7/2002 | Klosterman et al. |
| 2002/0133819 A1 | 9/2002 | Jackson |
| 2002/0149591 A1 | 10/2002 | Van Der Vleuten et al. |
| 2002/0162111 A1 | 10/2002 | Shimizu et al. |
| 2002/0172281 A1 | 11/2002 | Mantchala et al. |
| 2002/0176025 A1 | 11/2002 | Kim |
| 2002/0178444 A1 | 11/2002 | Trajkovic et al. |
| 2003/0012554 A1 | 1/2003 | Zeidler et al. |
| 2003/0016876 A1 | 1/2003 | Chai et al. |
| 2003/0043847 A1 | 3/2003 | Haddad |
| 2003/0067479 A1 | 4/2003 | Jung et al. |
| 2003/0072555 A1 | 4/2003 | Yap et al. |

(56) References Cited

U.S. PATENT DOCUMENTS

| | | |
|---|---|---|
| 2003/0081934 A1 | 5/2003 | Kirmuss |
| 2003/0093418 A1 | 5/2003 | Archbold |
| 2003/0093800 A1 | 5/2003 | Demas et al. |
| 2003/0110514 A1 | 6/2003 | West |
| 2003/0113098 A1 | 6/2003 | Willis |
| 2003/0121037 A1 | 6/2003 | Swix et al. |
| 2003/0123849 A1 | 7/2003 | Nallur |
| 2003/0135857 A1 | 7/2003 | Pendakur et al. |
| 2003/0161407 A1 | 8/2003 | Murdock et al. |
| 2003/0189982 A1 | 10/2003 | MacInnis |
| 2003/0195977 A1 | 10/2003 | Liu et al. |
| 2003/0206596 A1 | 11/2003 | Carver et al. |
| 2004/0010807 A1 | 1/2004 | Urdang et al. |
| 2004/0012510 A1 | 1/2004 | Chen |
| 2004/0028227 A1 | 2/2004 | Yu |
| 2004/0040035 A1 | 2/2004 | Carlucci et al. |
| 2004/0047469 A1 | 3/2004 | Ryan |
| 2004/0056884 A1 | 3/2004 | Eifrig et al. |
| 2004/0071354 A1 | 4/2004 | Adachi et al. |
| 2004/0078186 A1 | 4/2004 | Nair |
| 2004/0128578 A1 | 7/2004 | Jonnalagadda |
| 2004/0133908 A1 | 7/2004 | Smith et al. |
| 2004/0139462 A1 | 7/2004 | Hannuksela et al. |
| 2004/0177369 A1 | 9/2004 | Akins |
| 2004/0179619 A1 | 9/2004 | Tian et al. |
| 2004/0187160 A1 | 9/2004 | Cook |
| 2004/0210925 A1 | 10/2004 | Miyazawa et al. |
| 2004/0218816 A1 | 11/2004 | Hannuksela |
| 2004/0228413 A1 | 11/2004 | Hannuksela |
| 2004/0230994 A1 | 11/2004 | Urdang et al. |
| 2004/0257472 A1 | 12/2004 | Mpr et al. |
| 2005/0002574 A1 | 1/2005 | Fukuhara et al. |
| 2005/0013249 A1 | 1/2005 | Kong et al. |
| 2005/0022245 A1 | 1/2005 | Nallur et al. |
| 2005/0053134 A1 | 3/2005 | Holcomb |
| 2005/0053140 A1 | 3/2005 | Holcomb |
| 2005/0053141 A1 | 3/2005 | Holcomb |
| 2005/0053142 A1 | 3/2005 | Holcomb |
| 2005/0053143 A1 | 3/2005 | Holcomb |
| 2005/0053144 A1 | 3/2005 | Holcomb |
| 2005/0053155 A1 | 3/2005 | Holcomb |
| 2005/0053295 A1 | 3/2005 | Holcomb |
| 2005/0058201 A1 | 3/2005 | Fernandes |
| 2005/0069212 A1 | 3/2005 | Bottreau et al. |
| 2005/0084166 A1 | 4/2005 | Boneh et al. |
| 2005/0123056 A1 | 6/2005 | Wang |
| 2005/0175098 A1 | 8/2005 | Narasimhan et al. |
| 2005/0190774 A1 | 9/2005 | Wiegand |
| 2005/0207733 A1 | 9/2005 | Gargi |
| 2005/0226323 A1 | 10/2005 | Secker |
| 2005/0226325 A1 | 10/2005 | Dei et al. |
| 2005/0226327 A1 | 10/2005 | Kim |
| 2005/0229225 A1 | 10/2005 | Klausberger et al. |
| 2005/0254498 A1 | 11/2005 | Itoh |
| 2005/0259946 A1 | 11/2005 | Kitamura |
| 2005/0281328 A1 | 12/2005 | Hurst, Jr. et al. |
| 2005/0281329 A1 | 12/2005 | Chin |
| 2006/0013305 A1 | 1/2006 | Sun |
| 2006/0013557 A1 | 1/2006 | Poslinski |
| 2006/0036551 A1 | 2/2006 | Oliveira et al. |
| 2006/0072597 A1 | 4/2006 | Hannuksela |
| 2006/0075449 A1 | 4/2006 | Jagadeesan et al. |
| 2006/0083298 A1 | 4/2006 | Wang |
| 2006/0083311 A1 | 4/2006 | Winger |
| 2006/0093045 A1 | 5/2006 | Anderson et al. |
| 2006/0093315 A1 | 5/2006 | Kelly et al. |
| 2006/0104356 A1 | 5/2006 | Crinon |
| 2006/0109856 A1 | 5/2006 | Deshpande |
| 2006/0117357 A1 | 6/2006 | Surline |
| 2006/0120463 A1 | 6/2006 | Wang |
| 2006/0126728 A1 | 6/2006 | Yu et al. |
| 2006/0129914 A1 | 6/2006 | Ellis |
| 2006/0132822 A1 | 6/2006 | Walmsley |
| 2006/0133645 A1 | 6/2006 | Rhoads et al. |
| 2006/0147121 A1 | 7/2006 | Maeda et al. |
| 2006/0170571 A1 | 8/2006 | Martinian et al. |
| 2006/0171471 A1* | 8/2006 | Zhou .................. H04N 7/52 375/240.25 |
| 2006/0188169 A1 | 8/2006 | Tener et al. |
| 2006/0222319 A1 | 10/2006 | Russ |
| 2006/0224763 A1 | 10/2006 | Altunbasak et al. |
| 2006/0227873 A1 | 10/2006 | Toebes et al. |
| 2006/0262861 A1 | 11/2006 | Kobayashi |
| 2006/0277566 A1 | 12/2006 | Vince et al. |
| 2006/0282319 A1 | 12/2006 | Maggio |
| 2006/0294171 A1 | 12/2006 | Bossen |
| 2007/0011447 A1* | 1/2007 | Murray .................. H04H 60/07 713/151 |
| 2007/0019724 A1 | 1/2007 | Tourapis et al. |
| 2007/0025688 A1 | 2/2007 | Pejhan |
| 2007/0030186 A1 | 2/2007 | Archbold |
| 2007/0030356 A1 | 2/2007 | Yea |
| 2007/0030818 A1 | 2/2007 | Bahnck et al. |
| 2007/0031110 A1 | 2/2007 | Rijckaert |
| 2007/0038921 A1 | 2/2007 | Pekonen et al. |
| 2007/0053665 A1 | 3/2007 | Kato |
| 2007/0064739 A1 | 3/2007 | Krishnamachari |
| 2007/0081586 A1 | 4/2007 | Raveendran et al. |
| 2007/0091997 A1 | 4/2007 | Fogg et al. |
| 2007/0101359 A1 | 5/2007 | Schiller et al. |
| 2007/0106760 A1 | 5/2007 | Houh et al. |
| 2007/0109409 A1 | 5/2007 | Yea |
| 2007/0112721 A1 | 5/2007 | Archbold |
| 2007/0116277 A1 | 5/2007 | Ro et al. |
| 2007/0116426 A1 | 5/2007 | Toma et al. |
| 2007/0121721 A1 | 5/2007 | Kim et al. |
| 2007/0133674 A1 | 6/2007 | Garnier et al. |
| 2007/0140358 A1 | 6/2007 | Schwartz et al. |
| 2007/0147686 A1 | 6/2007 | Joshi |
| 2007/0153679 A1 | 7/2007 | Jost et al. |
| 2007/0153916 A1 | 7/2007 | Demircin et al. |
| 2007/0172133 A1 | 7/2007 | Kim |
| 2007/0183494 A1 | 8/2007 | Hannuksela |
| 2007/0186240 A1 | 8/2007 | Ward et al. |
| 2007/0194975 A1 | 8/2007 | Jang et al. |
| 2007/0223595 A1 | 9/2007 | Hannuksela et al. |
| 2007/0230460 A1 | 10/2007 | Jeong et al. |
| 2007/0230496 A1 | 10/2007 | Guo et al. |
| 2007/0242139 A1 | 10/2007 | Horita et al. |
| 2007/0245382 A1 | 10/2007 | Doi et al. |
| 2007/0250890 A1 | 10/2007 | Joshi |
| 2007/0253490 A1 | 11/2007 | Makino |
| 2007/0280350 A1 | 12/2007 | Mathew et al. |
| 2007/0286280 A1 | 12/2007 | Saigo et al. |
| 2007/0286283 A1 | 12/2007 | Yin et al. |
| 2007/0292107 A1 | 12/2007 | Yahata et al. |
| 2007/0297460 A1 | 12/2007 | Muneishi et al. |
| 2008/0013620 A1* | 1/2008 | Hannuksela ......... H04N 19/597 375/240.01 |
| 2008/0022340 A1 | 1/2008 | Hannuksela et al. |
| 2008/0025399 A1 | 1/2008 | Le Leannec et al. |
| 2008/0037656 A1 | 2/2008 | Hannuksela |
| 2008/0037658 A1 | 2/2008 | Price et al. |
| 2008/0037957 A1 | 2/2008 | Nallur et al. |
| 2008/0044164 A1 | 2/2008 | Fujinami |
| 2008/0055463 A1 | 3/2008 | Lerner |
| 2008/0056358 A1 | 3/2008 | Fuchie et al. |
| 2008/0056383 A1 | 3/2008 | Ueki et al. |
| 2008/0063074 A1 | 3/2008 | Gallant et al. |
| 2008/0089422 A1 | 4/2008 | Karczewicz |
| 2008/0115175 A1 | 5/2008 | Rodriguez |
| 2008/0115176 A1 | 5/2008 | Rodriguez |
| 2008/0117985 A1 | 5/2008 | Chen |
| 2008/0127255 A1 | 5/2008 | Ress et al. |
| 2008/0131079 A1 | 6/2008 | Toma |
| 2008/0137728 A1 | 6/2008 | Van Der Stok et al. |
| 2008/0137742 A1 | 6/2008 | Chen |
| 2008/0141091 A1 | 6/2008 | Kalluri |
| 2008/0151101 A1 | 6/2008 | Tian et al. |
| 2008/0152005 A1 | 6/2008 | Oguz et al. |
| 2008/0152006 A1 | 6/2008 | Chen et al. |
| 2008/0163308 A1 | 7/2008 | Kim |
| 2008/0192817 A1 | 8/2008 | Llach et al. |
| 2008/0219393 A1 | 9/2008 | Toma et al. |

(56) References Cited

U.S. PATENT DOCUMENTS

| | | |
|---|---|---|
| 2008/0225850 A1 | 9/2008 | Oran et al. |
| 2008/0225951 A1 | 9/2008 | Young |
| 2008/0235722 A1 | 9/2008 | Baugher et al. |
| 2008/0244658 A1 | 10/2008 | Chen |
| 2008/0247463 A1 | 10/2008 | Buttimer |
| 2008/0253466 A1 | 10/2008 | Fu |
| 2008/0256409 A1 | 10/2008 | Oran et al. |
| 2008/0260045 A1 | 10/2008 | Rodriguez et al. |
| 2008/0263581 A1 | 10/2008 | Turner |
| 2008/0273596 A1 | 11/2008 | Oguz et al. |
| 2008/0276267 A1 | 11/2008 | Badt et al. |
| 2008/0311869 A1 | 12/2008 | Koga et al. |
| 2008/0320558 A1 | 12/2008 | Imanishi et al. |
| 2009/0002379 A1 | 1/2009 | Baeza |
| 2009/0003439 A1* | 1/2009 | Wang .................. H04N 19/31 375/240.08 |
| 2009/0003446 A1 | 1/2009 | Wu |
| 2009/0003447 A1 | 1/2009 | Christoffersen |
| 2009/0016203 A1 | 1/2009 | Yahata et al. |
| 2009/0028247 A1 | 1/2009 | Suh |
| 2009/0028447 A1 | 1/2009 | Yatabe et al. |
| 2009/0033791 A1 | 2/2009 | Rodriguez |
| 2009/0034627 A1 | 2/2009 | Rodriguez et al. |
| 2009/0034633 A1 | 2/2009 | Rodirguez et al. |
| 2009/0041130 A1* | 2/2009 | Yoon ................ H04N 21/23432 375/240.26 |
| 2009/0073928 A1 | 3/2009 | Power |
| 2009/0086816 A1 | 4/2009 | Leontaris et al. |
| 2009/0097568 A1 | 4/2009 | Karczewicz et al. |
| 2009/0100482 A1 | 4/2009 | Rodriguez et al. |
| 2009/0103635 A1 | 4/2009 | Pahalawatta |
| 2009/0109342 A1 | 4/2009 | Heng et al. |
| 2009/0116558 A1 | 5/2009 | Chen |
| 2009/0138668 A1 | 5/2009 | Blankenship |
| 2009/0141168 A1 | 6/2009 | Chen et al. |
| 2009/0147859 A1 | 6/2009 | McGowan et al. |
| 2009/0148056 A1 | 6/2009 | Rodriguez et al. |
| 2009/0148132 A1 | 6/2009 | Rodriguez et al. |
| 2009/0154560 A1 | 6/2009 | Hong |
| 2009/0154563 A1 | 6/2009 | Hong |
| 2009/0161770 A1 | 6/2009 | Dong |
| 2009/0180546 A1 | 7/2009 | Rodriguez et al. |
| 2009/0180547 A1 | 7/2009 | Rodriguez et al. |
| 2009/0190655 A1 | 7/2009 | Shimada |
| 2009/0190849 A1 | 7/2009 | Huang |
| 2009/0196571 A1 | 8/2009 | Rodriguez et al. |
| 2009/0199231 A1 | 8/2009 | Tsuria et al. |
| 2009/0201988 A1 | 8/2009 | Gazier et al. |
| 2009/0207904 A1 | 8/2009 | Pandit et al. |
| 2009/0210412 A1 | 8/2009 | Oliver |
| 2009/0214178 A1 | 8/2009 | Takahashi |
| 2009/0220012 A1 | 9/2009 | Rodriguez et al. |
| 2009/0226105 A1 | 9/2009 | Huang |
| 2009/0262804 A1 | 10/2009 | Pandit |
| 2009/0279608 A1 | 11/2009 | Jeon |
| 2009/0285284 A1 | 11/2009 | Toma et al. |
| 2009/0296811 A1 | 12/2009 | Jeon |
| 2009/0310934 A1 | 12/2009 | Rodriguez et al. |
| 2009/0313662 A1 | 12/2009 | Rodriguez |
| 2009/0313668 A1 | 12/2009 | Shepherd |
| 2009/0323822 A1 | 12/2009 | Rodriguez et al. |
| 2010/0020870 A1 | 1/2010 | Jeon |
| 2010/0026882 A1 | 2/2010 | Jeon |
| 2010/0026883 A1 | 2/2010 | Jeon |
| 2010/0026884 A1 | 2/2010 | Jeon |
| 2010/0027417 A1 | 2/2010 | Franceschini et al. |
| 2010/0027653 A1 | 2/2010 | Jeon |
| 2010/0027654 A1 | 2/2010 | Jeon |
| 2010/0027659 A1 | 2/2010 | Jeon |
| 2010/0027660 A1 | 2/2010 | Jeon |
| 2010/0027667 A1 | 2/2010 | Samuelsson et al. |
| 2010/0027682 A1 | 2/2010 | Jeon |
| 2010/0074340 A1 | 3/2010 | Luo et al. |
| 2010/0088717 A1 | 4/2010 | Candelore et al. |
| 2010/0118973 A1 | 5/2010 | Rodriguez et al. |
| 2010/0118974 A1 | 5/2010 | Rodriguez et al. |
| 2010/0118978 A1 | 5/2010 | Rodriguez et al. |
| 2010/0118979 A1 | 5/2010 | Rodriguez et al. |
| 2010/0122311 A1 | 5/2010 | Rodriguez et al. |
| 2010/0150232 A1 | 6/2010 | Nguyen et al. |
| 2010/0150234 A1 | 6/2010 | Koo et al. |
| 2010/0150527 A1 | 6/2010 | Sandoval |
| 2010/0195721 A1 | 8/2010 | Wu et al. |
| 2010/0215338 A1 | 8/2010 | Rodriguez |
| 2010/0218232 A1 | 8/2010 | Rodriguez |
| 2010/0241753 A1 | 9/2010 | Garbajs et al. |
| 2010/0292820 A1 | 11/2010 | Yahata et al. |
| 2010/0293571 A1 | 11/2010 | Rodriguez |
| 2010/0322302 A1 | 12/2010 | Rodriguez |
| 2011/0222837 A1 | 9/2011 | Walton et al. |
| 2012/0263228 A1 | 10/2012 | Rodriguez et al. |
| 2013/0028314 A1 | 1/2013 | Rodriguez et al. |
| 2014/0226730 A1 | 8/2014 | Rodriguez et al. |
| 2014/0307804 A1 | 10/2014 | Rodriguez et al. |
| 2014/0351854 A1 | 11/2014 | Rodriguez et al. |
| 2015/0016549 A1 | 1/2015 | Rodriguez et al. |
| 2015/0016806 A1 | 1/2015 | Rodriguez et al. |
| 2015/0117552 A1 | 4/2015 | Rodriguez et al. |
| 2015/0127847 A1 | 5/2015 | Rodriguez et al. |
| 2015/0189303 A1 | 7/2015 | Rodriguez et al. |
| 2015/0189332 A1 | 7/2015 | Rodriguez et al. |
| 2016/0345029 A1 | 11/2016 | Rodriguez et al. |

FOREIGN PATENT DOCUMENTS

| | | |
|---|---|---|
| CN | 2009 8 0145072.2 | 7/2014 |
| EP | 0 812 112 A2 | 12/1997 |
| EP | 1 292 138 A2 | 3/2003 |
| EP | 1 328 119 A1 | 7/2003 |
| EP | 1 480 460 A1 | 11/2004 |
| JP | 05-236465 A | 9/1993 |
| KR | 10-2004-00547 08 | 6/2004 |
| WO | WO 00/00981 A2 | 1/2000 |
| WO | WO 00/62552 A2 | 10/2000 |
| WO | WO 01/01702 | 1/2001 |
| WO | WO 01/43440 A | 6/2001 |
| WO | WO 01/63774 A | 8/2001 |
| WO | WO 2004/102571 A1 | 11/2004 |
| WO | WO 2005/106875 A1 | 11/2005 |
| WO | 2006/073207 A2 | 7/2006 |
| WO | WO 2006/083824 A2 | 8/2006 |
| WO | WO 2006/101979 A | 9/2006 |
| WO | WO 2006/114761 A1 | 11/2006 |
| WO | WO 2008/005040 A1 | 1/2008 |
| WO | WO 2008/063881 A2 | 5/2008 |
| WO | WO 2009/018360 A1 | 2/2009 |
| WO | WO 2009/052262 A2 | 4/2009 |

OTHER PUBLICATIONS

U.S. Notice of Allowance dated Jan. 29, 2016 in U.S. Appl. No. 14/253,043, 18 pgs.

U.S. Appl. No. 12/417,864, filed Apr. 3, 2009 entitled "System and Method for Authorization of Segment Boundary Notifications", Inventors: Theodore R. Grevers, Arturo A. Rodriguez, and Anthony J. Wasilewski.

U.S. Appl. No. 12/492,117, filed Jun. 25, 2009 entitled "Support for Blocking Trick Mode Operations", Inventors: Arturo A. Rodriguez and Benjamin M. Cook.

U.S. Appl. No. 12/483,925, filed Jun. 12, 2009 entitled "Picture Interdependencies Signals in Context of MMCO to Assist Stream Manipulation", Inventors: Arturo A. Rodriguez and Benjamin M. Cook.

U.S. Appl. No. 12/417,868, filed Apr. 3, 2009 entitled "Segment Boundary Notification to a Digital Media Receiver", Inventors: Theodore R. Grevers, Arturo A. Rodriguez, and Anthony J. Wasilewski.

U.S. Appl. No. 12/417,869, filed Apr. 3, 2009 entitled "System and Method for Processing Segment Boundary Notifications", Inventors: Theodore R. Grevers, Arturo A. Rodriguez, and Anthony J. Wasilewski.

(56) References Cited

OTHER PUBLICATIONS

U.S. Appl. No. 12/709,851, filed Feb. 22, 2010 entitled "Signalling of Decodable Sub-Sequences", Inventor: Arturo A. Rodriguez
U.S. Appl. No. 12/713,153, filed Feb. 25, 2010 entitled "Signalling of Auxiliary Information that Assists Processing of Video According to Various Formats", Inventors: Rodriguez et al.
U.S. Appl. No. 12/722,117, filed Mar. 11, 2010 entitled "Management of Picture Referencing in Video Streams for Plural Playback Modes", Inventors: Walton et al.
U.S. Appl. No. 12/779,035, filed May 12, 2010 entitled "Signalling Buffer Characteristics for Splicing Operations of Video Streams", Inventors: Rodriguez et al.
U.S. Appl. No. 12/616,974, filed, Nov. 12, 2009, entitled "Error Concealment of Plural Processed Representations of a Single Video Signal Received in a Video Program", Rodriguez et al.
U.S. Appl. No. 12/616,991, filed Nov. 12, 2009, entitled "Processing Latticed and Non-Latticed Pictures of a Video Program", Rodriguez et al.
U.S. Appl. No. 12/617,015, filed Nov. 12, 2009, entitled "Facilitating Fast Channel Changes Through Promotion of Pictures", Rodriguez et al.
U.S. Appl. No. 12/617,043, filed Nov. 12, 2009, entitled "Targeted Bit Appropriations Based on Picture Importance", Rodriguez et al.
U.S. Appl. No. 12/617,062, filed Nov. 12, 2009, entitled "Processing of a Video Program Having Plural Processed Representations of a Single Video Signal for Reconstruction and Output", Rodriguez et al.
U.S. Appl. No. 12/141,015, filed Jun. 17, 2008, entitled "Time-Shifted Transport of Multi-Latticed Video for Resiliency from Burst-Error Effects", Shepherd et al.
U.S. Appl. No. 12/141,017, filed Jun. 17, 2008, entitled "Methods and Systems for Processing Multi-Latticed Video Streams", Rodriguez et al.
U.S. Appl. No. 12/141,019, filed Jun. 17, 2008, entitled "Processing of Impaired and Incomplete Multi-Latticed Video Streams", Rodriguez et al.
U.S. Appl. No. 12/819,157, filed Jun. 18, 2010, entitled "Dynamic Streaming with Latticed Representations of Video", Rodriguez et al.
U.S. Appl. No. 13/633,672, filed Oct. 2, 2012, entitled "Dynamic Streaming Plural Lattice Video Coding Representations of Video," Rodriguez et al.
U.S. Appl. No. 14/313,266, filed Jun. 24, 2014, entitled "Receiving and Processing Multi-Latticed Video", Rodriguez et al.
Amon et al., "File Format for Scalable Video Coding", IEEE Transactions on Circuits and Systems for Video Technology, vol. 17 No. 9, Sep. 2007, pp. 1174-1185.
Gruneberg et al., International Organisation for Standardisation Organisation Internationale de Normalisation ISO/IEC JTC1/SC29/WG11 Coding of Moving Pictures and Audio, "Proposal for MPEG-2 Transport Stream Extensions for Scalable Video Coding", XP030043296, Jul. 2007, 6 pages.
Hurst et al., "MPEG Splicing Tutorial and Proposed SMPTE Standard", Proceedings of the SMPTE Technical Conference, Nov. 1997, pp. 105-117.
ITU: "Series H: Audiovisual and Multimedia Systems: Infrastructure of Audiovisual Services—Transmission Multiplexing and Synchronization", Systems ITU-T Recommendation H.222.0, May 2006, http://mirror.itu.int/dms/pay/itu-t/rec/h/T-REC-H.222.0-200605-I PDF E.pdf, XP007905991, pp. 1-76.
ITU-T Telecommunication Standardization Sector of ITU, Infrastrcture of Audiovisual Services—Coding of Moving Video, "Advanced Video Coding for Generic Audiovisual Services", International Telecommunication Union, H.264, May 2003, XP008095420, 282 pages.
Luo et al., "On HRD conformance for splice bitstreams", JVT Meeting, Document JVT-V055r1, Filename JVT-V055r1.doc, XP-30006863, Jan. 2007, pp. 1-11.
MacInnis et al., International Organisation for Standardization Organisation Internationale Normalisation ISO/IEC JTC1/SC29/WG11 Coding of Moving Pictures and Audio, "NAL for AVC Video with MPEG-2 Systems", Video Standards and Drafts, Mar. 2002, pp. 1-11.
Rodriguez et al., "SEI message to convey suitable splice points in the bitstream", JVT Meeting, Document JVT-Z040, Filename JVT-Z040.doc, XP-30007329, Jan. 2008, pp. 1-8.
"Splice Points for MPEG-2 Transport Streams", SMPTE Journal, SMPTE Inc., vol. 107 No. Oct. 1998, XP-000793004, pp. 916-925.
Stuhlmuller, Klaus, et al., "Analysis of Video Transmission over Lossy Channels"; IEEE Journal on Selected Areas in Communication, vol. 18, No. 6, Jun. 2000, pp. 1012-1032.
Tian et al., "Sub-Sequence Video Coding for Improved Temporal Scalability", presented at the *IEEE International Symposium on Circuits and Systems—ISCAS*, pp. 6074-6077, 2005.
D.T. Nguyen and J. Ostermann, "Congestion Control using Scalable Video Coding based on H. 264/AVC," IEEE Journal of Selected Topics in Signal Processing, vol. 1 No. 2, Aug. 2007, 8 pages.
Digital Video Image Quality and Perceptual Coding edited by H.R. Wu and K.R. Rao, CRC Press 2005, pp. 503-541.
Author Unknown, SMPTE Standard for Television—Splice Points for MPEG-2 Transport Streams, The Society of Motion Picture and Television Engineers, Copyright 1999, http://www.ietf.org/mail-archive/web/avtext/current/pdf6u0ckuE66s.pdf, accessed May 30, 2012, 20 pages.
Hannuksela et al., "H.264/AVC Video for Wireless Transmission," IEEE Wireless Communications, IEEE Service Center, Piscataway, NJ, US, vol. 12, No. 4, Aug. 1, 2005 (Aug. 1, 2005), pp. 6-13.
Psannis K. et al., "Efficient Flexible Macroblock Ordering Technique," IEICE Transactions on Communications, Communications Society, Tokyo JP, vol. E19B, No. 8, Aug. 1, 2008 (Aug. 1, 2008), pp. 2692-2701.
Tom A. S. et al., "Packet Video for Cell Loss Protection Using Deinterleaving and Scrambling," Speech Processing 1. Toronto, May 14-17, 1991; [International Conference on Acoustics, Speech & Signal Processing. ICASSP], New York, IEEE, US, vol. CONF. 16, Apr. 14, 1991 (Apr. 14, 1991), pp. 2857-2860.
Schwarz H. et al., "SVC Overview," 21. JVT Metting; 78. MPEG Meeting; Oct. 20, 2006-Oct. 27, 2006; Hangzhou CN; (Joint Video Team of ISO/IEC JTC1/SC29/WG11 and ITU-T SG.16), No. JVT-U145, Oct. 20, 2006 (Oct. 20, 2006), 20 pages.
Yao Wang et al., "Error Control and Concealment for Video Communication: A Review," Proceedings of the IEEE, New York, vol. 86, No. 5, May 1, 1998, 24 pages.
Zhu et al., "Coding and Cell-Loss Recovery in DCT-Based Packet Video," IEEE Transactions on Circuits and Systems for Video Technology, Jun. 3, 1993, New York U.S., 11 pages.
International Search Report dated Sep. 4, 2009 cited in International Application No. PCT/US2009/047237.
Written Opinion dated Sep. 4, 2009 cited in International Application No. PCT/US2009/047237.
International Search Report dated Sep. 4, 2009 cited in International Application No. PCT/US2009/044370.
Written Opinion dated Sep. 4, 2009 cited in International Application No. PCT/US2009/044370.
International Search Report dated May 23, 2008 cited in International Application No. PCT/US2007/083867.
Written Opinion dated May 23, 2008 cited in International Application No. PCT/US2007/083867.
International Search Report and Written Opinion dated Oct. 30, 1998 cited in International Application No. PCT/US2008/071621.
International Search Report and Written Opinion dated Oct. 18, 2004 cited in International Application No. PCT/US2004/023279.
International Search Report and Written Opinion dated Apr. 15, 2009 cited in International Application No. PCT/US2008/080128.
International Preliminary Report on Patentability and Written Opinion dated Feb. 2, 2010 cited in International Application No. PCT/US2008/071111.
International Search Report and Written Opinion dated Apr. 15, 2010 cited in International Application No. PCT/US2010/024927.
PCT Search Report cited in International Appln No. PCT/US2009/064180 dated Jan. 8, 2010.
PCT Written Opinion cited in International Appln No. PCT/US2009/064180 dated Jan. 8, 2010.

(56) References Cited

OTHER PUBLICATIONS

PCT Search Report cited in International Appln No. PCT/US2009/047521 dated Dec. 22, 2009.
PCT Written Opinion cited in International Appln No. PCT/US2009/047521 dated Dec. 22, 2009.
Canadian Office Action dated Dec. 11, 2009 in Application No. 2,533,169.
European Examination dated May 4, 2010 in Application No. 07 844 937.8.
European Examination dated Sep. 16, 2010 in Application No. 08 796 875.6.
European Communication dated Aug. 9, 2011 in Application No. 08 838 787.3, 4 pages.
European Communication dated Sep. 22, 2011 in Application No. 08796584.4, 9 pages.
European Communication dated Dec. 14, 2011 in Application No. 09 751 294.1, 5 pages.
Chinese First Office Action dated Dec. 31, 2011 in Application No. 200880121233.X, 7 pages.
Canadian Office Action dated Jun. 6, 2012 in Application No. 2,669,552, 3 pages.
European Communication dated Jul. 5, 2012 in Application No. 08838787.3, 6 pages.
Supplementary European Search Report dated Jul. 17, 2012 in Application No. 09826735, 3 pages.
Supplementary European Search Report dated Jul. 26, 2012 in Application No. 09767598, 7 pages.
Chinese First Office Action dated Aug. 31, 2012 in Application No. 200980118689.5, 12 pages.
Chinese First Office Action dated Feb. 21, 2013 in Application No. 200980145072.2, 16 pages.
European Communication dated Mar. 22, 2013 in Application No. 09 826 735.4, 7 pages.
European Communication dated Mar. 22, 2013 in Application No. 09 767 598.7, 5 pages.
European Communication dated Oct. 15, 2013 in Application No. 09 767 598.7, 6 pages.
Chinese Second Office Action dated Oct. 25, 2013 in Application No. 200980145072.2, 4 pages.
Chinese Office Action dated Nov. 13, 2013 in Appln No. 200980124140.7, 15 pgs.
U.S. Non-final Office Action in U.S. Appl. No. 10/623,683 dated Dec. 28, 2007.
U.S. Final Office Action in U.S. Appl. No. 10/623,683 dated Jul. 25, 2008.
U.S. Non-Final Office Action in U.S. Appl. No. 11/627,452 dated Nov. 10, 2010.
U.S. Non-Final Office Action in U.S. Appl. No. 11/831,916 dated Feb. 1, 2010.
U.S. Non-Final Office Action in U.S. Appl. No. 11/831,916 dated Aug. 4, 2010.
U.S. Final Office Action in U.S. Appl. No. 11/627,452 dated Mar. 4, 2011.
U.S. Non-Final Office Action in U.S. Appl. No. 11/831,916 dated Mar. 31, 2011.
U.S. Non-Final Office Action in U.S. Appl. No. 12/417,869 dated Apr. 4, 2011.
U.S. Non-Final Office Action in U.S. Appl. No. 12/417,864 dated Apr. 18, 2011, 25 pages.
U.S. Final Office Action dated Jul. 5, 2011 in U.S. Appl. No. 12/417,864, 13 pages.
U.S. Non-Final Office Action dated Aug. 5, 2011 in U.S. Appl. No. 11/831,906, 38 pages.
U.S. Final Office Action dated Aug. 5, 2011 in U.S. Appl. No. 12/417,869, 10 pages.
U.S. Non-Final Office Action dated Sep. 14, 2011 in U.S. Appl. No. 12/124,779, 29 pages.
U.S. Non-Final Office Action dated Sep. 22, 2011 in U.S. Appl. No. 11/831,912, 35 pages.
U.S. Final Office Action dated Sep. 28, 2011 in U.S. Appl. No. 11/831,916, 44 pages.
U.S. Non-Final Office Action dated Nov. 10, 2011 in U.S. Appl. No. 12/483,925, 36 pages.
U.S. Non-Final Office Action dated Nov. 23, 2011 in U.S. Appl. No. 12/141,015, 30 pages.
U.S. Non-Final Office Action dated Nov. 29, 2011 in U.S. Appl. No. 12/492,117, 35 pages.
U.S. Non-Final Office Action dated Nov. 23, 2011 in U.S. Appl. No. 12/141,017, 32 pages.
U.S. Non-Final Office Action dated Dec. 21, 2011 in U.S. Appl. No. 12/333,296, 30 pages.
U.S. Non-Final Office Action dated Dec. 22, 2011 in U.S. Appl. No. 12/617,043, 34 pages.
U.S. Non-Final Office Action dated Dec. 27, 2011 in U.S. Appl. No. 12/417,869, 8 pages.
U.S. Non-Final Office Action dated Dec. 27, 2011 in U.S. Appl. No. 12/252,632, 31 pages.
U.S. Non-Final Office Action dated Jan. 4, 2012 in U.S. Appl. No. 12/617,062, 30 pages.
U.S. Non-Final Office Action dated Jan. 10, 2012 in U.S. Appl. No. 12/333,301, 37 pages.
U.S. Non-Final Office Action dated Jan. 18, 2012 in U.S. Appl. No. 12/617,015, 31 pages.
U.S. Final Office Action dated Jan. 19, 2012 in U.S. Appl. No. 12/124,779, 12 pages.
U.S. Final Office Action dated Feb. 17, 2012 in U.S. Appl. No. 11/627,452, 11 pages.
U.S. Non-Final Office Action dated Mar. 8, 2012 in U.S. Appl. No. 12/351,776, 31 pages.
U.S. Final Office Action dated Mar. 13, 2012 in U.S. Appl. No. 11/831,906, 24 pages.
U.S. Final Office Action dated Mar. 19, 2012 in U.S. Appl. No. 11/831,912, 20 pages.
U.S. Non-Final Office Action dated Mar. 26, 2012 in U.S. Appl. No. 12/395,676, 37 pages.
U.S. Non-Final Office Action dated Apr. 23, 2012 in U.S. Appl. No. 12/709,851, 29 pages.
U.S. Non-Final Office Action dated Apr. 25, 2012 in U.S. Appl. No. 12/141,019, 28 pages.
U.S. Final Office Action dated May 11, 2012 in U.S. Appl. No. 12/141,015, 25 pages.
U.S. Final Office Action dated May 18, 2012 in U.S. Appl. No. 12/492,117, 17 pages.
U.S. Non-Final Office Action dated May 23, 2012 in U.S. Appl. No. 12/616,974, 30 pages.
U.S. Final Office Action dated May 23, 2012 in U.S. Appl. No. 12/333,296, 21 pages.
U.S. Final Office Action dated May 23, 2012 in U.S. Appl. No. 12/333,301, 18 pages.
U.S. Final Office Action dated Jun. 11, 2012 in U.S. Appl. No. 12/141,017, 23 pages.
U.S. Final Office Action dated Jun. 4, 2012 in U.S. Appl. No. 12/252,632, 22 pages.
U.S. Non-Final Office Action dated Jun. 15, 2012 in U.S. Appl. No. 12/124,779, 12 pages.
U.S. Non-Final Office Action dated Jun. 20, 2012 in U.S. Appl. No. 12/722,117, 30 pages.
U.S. Non-Final Office Action dated Jun. 25, 2012 in U.S. Appl. No. 12/417,868, 37 pages.
U.S. Final Office Action dated Jul. 6, 2012 in U.S. Appl. No. 12/617,043, 26 pages.
U.S. Non-Final Office Action dated Jul. 10, 2012 in U.S. Appl. No. 12/417,869, 8 pages.
U.S. Final Office Action dated Jul. 16, 2012 in U.S. Appl. No. 12/351,776, 6 pages.
U.S. Non-Final Office Action dated Jul. 18, 2012 in U.S. Appl. No. 12/616,991, 25 pages.
U.S. Non-Final Office Action dated Aug. 10, 2012 in U.S. Appl. No. 12/483,925, 35 pages.
U.S. Non-Final Office Action dated Sep. 13, 2012 in U.S. Appl. No. 12/141,015, 22 pages.

(56) References Cited

OTHER PUBLICATIONS

U.S. Non-Final Office Action dated Oct. 2, 2012 in U.S. Appl. No. 12/417,864, 17 pages.
U.S. Non-Final Office Action dated Oct. 22, 2012 in U.S. Appl. No. 12/779,035, 33 pages.
U.S. Final Office Action dated Nov. 23, 2012 in U.S. Appl. No. 12/417,869, 16 pages.
U.S. Final Office Action dated Nov. 27, 2012 in U.S. Appl. No. 12/616,991, 34 pages.
U.S. Final Office Action dated Dec. 19, 2012 in U.S. Appl. No. 12/722,117, 24 pages.
U.S. Final Office Action dated Jan. 4, 2013 in U.S. Appl. No. 12/417,868, 19 pages.
U.S. Non-Final Office Action dated Jan. 24, 2013 in U.S. Appl. No. 12/713,153, 41 pages.
U.S. Non-Final Office Action dated Feb. 26, 2013 in U.S. Appl. No. 12/617,043, 31 pages.
U.S. Final Office Action dated Feb. 26, 2013 in U.S. Appl. No. 12/141,019, 14 pages.
U.S. Final Office Action dated Feb. 28, 2013 in U.S. Appl. No. 12/483,925, 37 pages.
U.S. Final Office Action dated Mar. 18, 2013 in U.S. Appl. No. 12/141,015, 23 pages.
U.S. Final Office Action dated Mar. 18, 2013 in U.S. Appl. No. 12/417,864, 13 pages.
U.S. Non-Final Office Action dated Mar. 20, 2013 in U.S. Appl. No. 11/831,912, 17 pages.
U.S. Final Office Action dated Apr. 8, 2013 in U.S. Appl. No. 12/779,035, 19 pages.
U.S. Non-Final Office Action dated Apr. 9, 2013 in U.S. 121/831,906, 22 pages.
U.S. Non-Final Office Action dated Apr. 9, 2013 in U.S. Appl. No. 12/492,117, 20 pages.
U.S. Non-Final Office Action dated Apr. 9, 2013 in U.S. Appl. No. 11/627,452, 11 pages.
U.S. Final Office Action dated Jun. 6, 2013 in U.S. Appl. No. 12/617,043, 27 pages.
U.S. Final Office Action dated Jun. 19, 2013 in U.S. Appl. No. 12/713,153, 19 pages.
U.S. Non-Final Office Action dated Jun. 21, 2013 in U.S. Appl. No. 12/483,925, 40 pages.
U.S. Non-Final Office Action dated Jul. 3, 2013 in U.S. Appl. No. 13/443,580, 25 pages.
U.S. Non-Final Office Action dated Jul. 16, 2013 in U.S. Appl. No. 12/333,296, 32 pages.
U.S. Non-Final Office Action dated Jul. 18, 2013 in U.S. Appl. No. 12/417,864, 14 pages.
U.S. Non-Final Office Action dated Aug. 7, 2013 in U.S. Appl. No. 12/333,301, 20 pages.
U.S. Final Office Action dated Sep. 6, 2013 in U.S. Appl. No. 12/492,117, 27, pages.
U.S. Non-Final Office Action dated Sep. 6, 2013 in U.S. Appl. No. 13/633,672, 22 pages.
U.S. Non-Final Office Action dated Sep. 11, 2013 in U.S. Appl. No. 12/722,117, 21 pages.
U.S. Final Office Action dated Sep. 26, 2013 in U.S. Appl. No. 11/831,912, 25 pages.
U.S. Non-Final Office Action dated Oct. 1, 2013 in U.S. Appl. No. 12/616,991, 18 pages.
U.S. Final Office Action dated Nov. 12, 2013 in U.S. Appl. No. 11/627,452, 22 pages.
U.S. Final Office Action dated Nov. 13, 2013 in U.S. Appl. No. 11/831,906, 32 pages.
U.S. Final Office Action dated Dec. 4, 2013 in U.S. Appl. No. 13/443,580, 9 pages.
U.S. Non-Final Office Action dated Dec. 13, 2013 in U.S. Appl. No. 12/141,019, 8 pages.
U.S. Non-Final Office Action dated Dec. 24, 2013 in U.S. Appl. No. 12/779,035, 15 pages.

U.S. Office Action dated Jan. 2, 2014 in U.S. Appl. No. 12/483,925, 47 pages.
U.S. Office Action dated Jan. 16, 2014 in U.S. Appl. No. 12/333,296, 18 pages.
U.S. Office Action dated Jan. 27, 2014 in U.S. Appl. No. 12/492,117, 23, pages.
U.S. Office Action dated Jan. 29, 2014 in U.S. Appl. No. 12/252,632, 22 pages.
U.S. Office Action dated Jan. 30, 2014 in U.S. Appl. No. 12/722,117, 22 pages.
U.S. Office Action dated Feb. 10, 2014 in U.S. Appl. No. 12/713,153, 18 pages.
U.S. Office Action dated Feb. 13, 2014 in U.S. Appl. No. 13/633,672, 5 pages.
U.S. Office Action dated Mar. 21, 2014 in U.S. Appl. No. 11/831,906, 20 pages.
U.S. Office Action dated Mar. 28, 2014 in U.S. Appl. No. 12/417,869, 12 pages.
U.S. Non-Final Office Action dated May 1, 2014 in U.S. Appl. No. 12/779,035, 21 pages.
U.S. Office Action dated Jun. 20, 2014 in U.S. Appl. No. 12/417,868, 41 pgs.
U.S. Office Action dated Jun. 20, 2014 in U.S. Appl. No. 13/633,672, 7 pgs.
U.S. Office Action dated Jul. 14, 2014 in U.S. Appl. No. 12/722,117, 31 pgs.
U.S. Office Action dated Jul. 25, 2014 in U.S. Appl. No. 12/713,153, 29 pgs.
U.S. Office Action dated Aug. 14, 2014 in U.S. Appl. No. 12/252,632, 23 pgs.
U.S. Office Action dated Aug. 27, 2014 in U.S. Appl. No. 12/492,117, 37 pgs.
U.S. Office Action dated Aug. 28, 2014 in U.S. Appl. No. 12/417,869, 11 pgs.
U.S. Office Action dated Jun. 3, 2016 cited in U.S. Appl. No. 14/591,037, 58 pgs.
U.S. Office Action dated Jun. 6, 2016 cited in U.S. Appl. No. 14/502,651, 65 pgs.
U.S. Appl. No. 15/224,694, filed Aug. 1, 2016 entitled Output of a Video Signal from Decoded and Derived Picture Information, Rodriguez et al.
Chinese Second Office Action dated Nov. 5, 2012 cited in Application No. 200880121233.X, 13 pgs.
European Summons to Attend Oral Proceedings dated Nov. 21, 2012 cited in Application No. 08838787.3, 4 pgs.
Chinese Third Office Action dated Apr. 27, 2013 cited in Application No. 200880121233.X, 7 pgs.
U.S. Office Action dated Jul. 5, 2016 cited in U.S. Appl. No. 12/252,632, 27 pgs.
U.S. Office Action dated Aug. 31, 2015 in U.S. Appl. No. 14/253,043, 57 pgs.
U.S. Appl. No. 14/253,043, filed Apr. 15, 2014, entitled "Methods and Systems for Processing Latticed Time-Skewed Video Streams," Rodriguez et al.
U.S. Appl. No. 14/457,236, filed Aug. 12, 2014, entitled "Managing Splice Points for Non-Seamless Concatenated Bitstreams", Rodriguez et al.
U.S. Appl. No. 14/502,651, filed Sep. 30, 2014, entitled "Determining Tracking Picture Candidates with Multiple Level Tiers", Rodriguez et al.
U.S. Appl. No. 14/585,312, filed Dec. 30, 2014, entitled "Reconstructing a Multi-LatticedVideo Signal", Rodriguez et al.
U.S. Appl. No. 14/591,037, filed Jan. 7, 2015, entitled "Splice Signalling Buffer Characteristics", Rodriguez et al.
U.S. Appl. No. 14/593,098, filed Jan. 9, 2015, entitled "Mitigating Impairments in Redundant Streams", Rodriguez et al.
U.S. Office Action dated Dec. 10, 2014 in U.S. Appl. No. 12/722,117, 28 pgs.
European Communication dated Jul. 3, 2014 in Appln No. 07 756 849.1, 4 pgs.
Canadian Office Action dated Jul. 7, 2014 in Appln No. 2,669,552, 3 pgs.

(56) References Cited

OTHER PUBLICATIONS

Chinese Second Office Action dated Jul. 14, 2014 in Application No. 200980124140.7, 7 pgs.
U.S. Office Action dated Sep. 17, 2014 in U.S. Appl. No. 12/351,776, 29 pgs.
U.S. Office Action dated Nov. 6, 2014 in U.S. Appl. No. 12/417,868, 41 pgs.
U.S. Office Action dated Nov. 6, 2014 in U.S. Appl. No. 13/633,672, 7 pgs.
U.S. Office Action dated Feb. 17, 2016 in U.S. Appl. No. 14/457,236, 20 pgs.
U.S. Notice of Allowance dated Mar. 31, 2016 cited in U.S. Appl. No. 14/585,312, 54 pgs.
U.S. Notice of Allowance dated Jul. 21, 2016 cited in U.S. Appl. No. 14/457,236, 26 pgs.
U.S. Appl. No. 14/658,293, filed Mar. 16, 2015, entitled "Assistance for Processing Pictures in Video Concatenated Streams", Rodriguez et al.
U.S. Office Action dated May 28, 2015 in U.S. Appl. No. 12/252,632, 29 pgs.
U.S. Office Action dated Aug. 13, 2015 in U.S. Appl. No. 14/457,236, 49 pgs.
U.S. Office Action dated Sep. 7, 2016 cited in U.S. Appl. No. 14/313,266, 75 pgs.
U.S. Office Action dated Dec. 20, 2016 cited in U.S. Appl. No. 15/224,694, 84 pgs.
U.S. Office Action dated Dec. 23, 2016 cited in U.S. Appl. No. 14/658,293, 70 pgs.
U.S. Final Office Action dated Dec. 30, 2016 cited in U.S. Appl. No. 12/252,632, 42 pgs.
U.S. Final Office Action dated Apr. 6, 2017 cited in U.S. Appl. No. 14/658,293, 17 pgs.
European Communication dated Dec. 20, 2016 cited in Application No. 09771081.8, 9 pgs.

\* cited by examiner

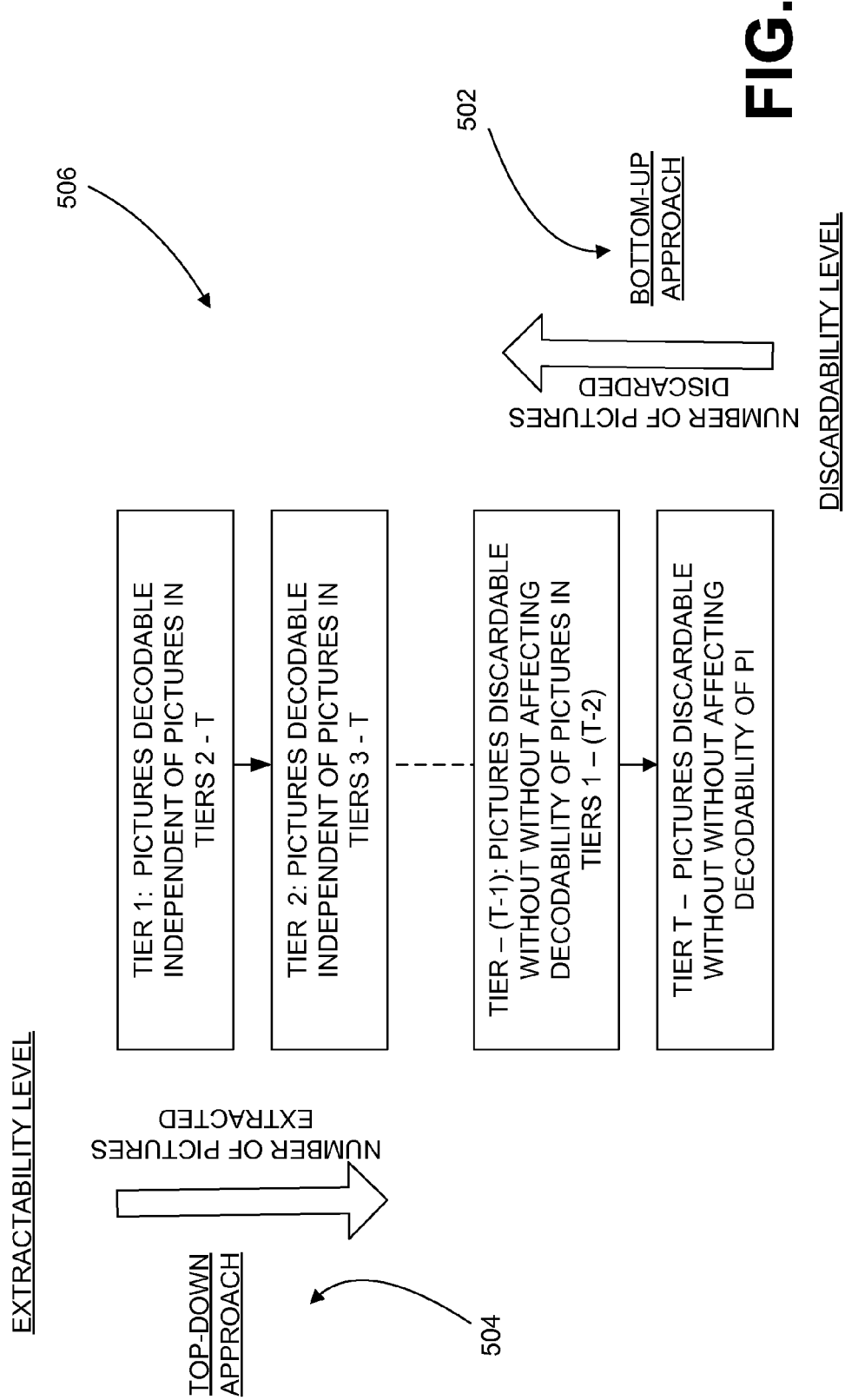

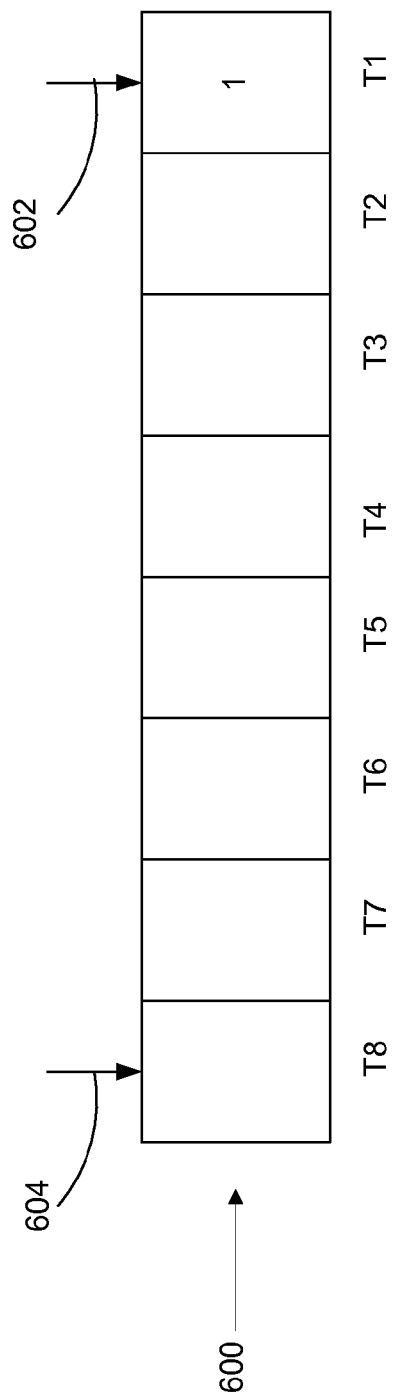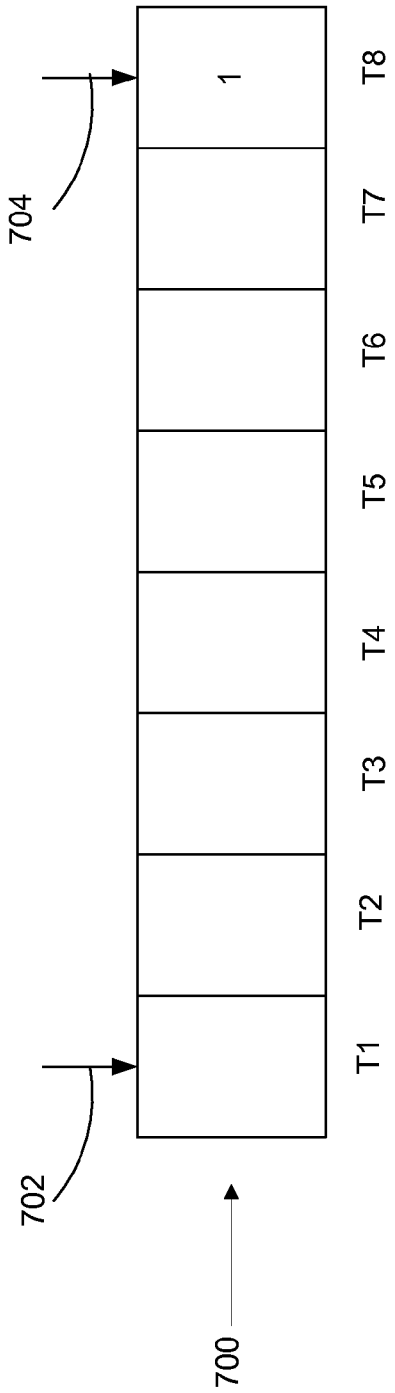

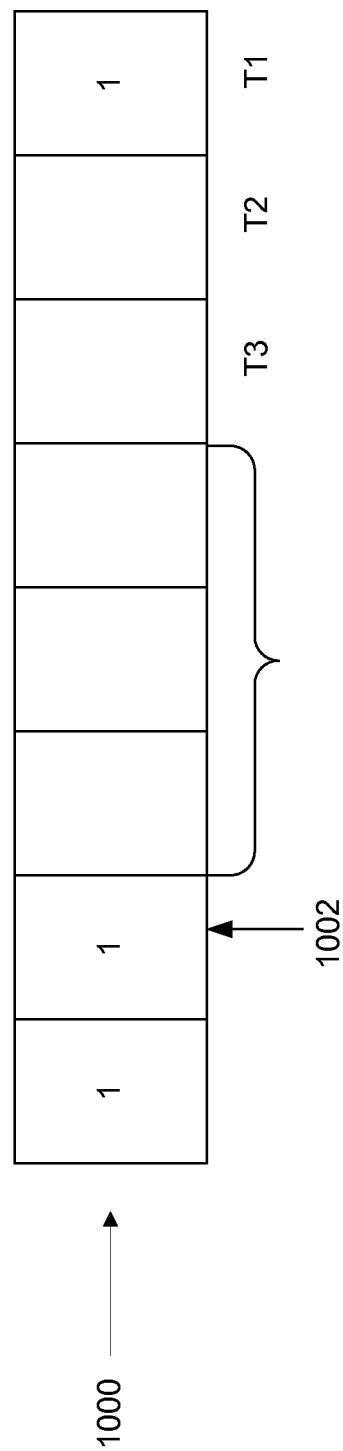

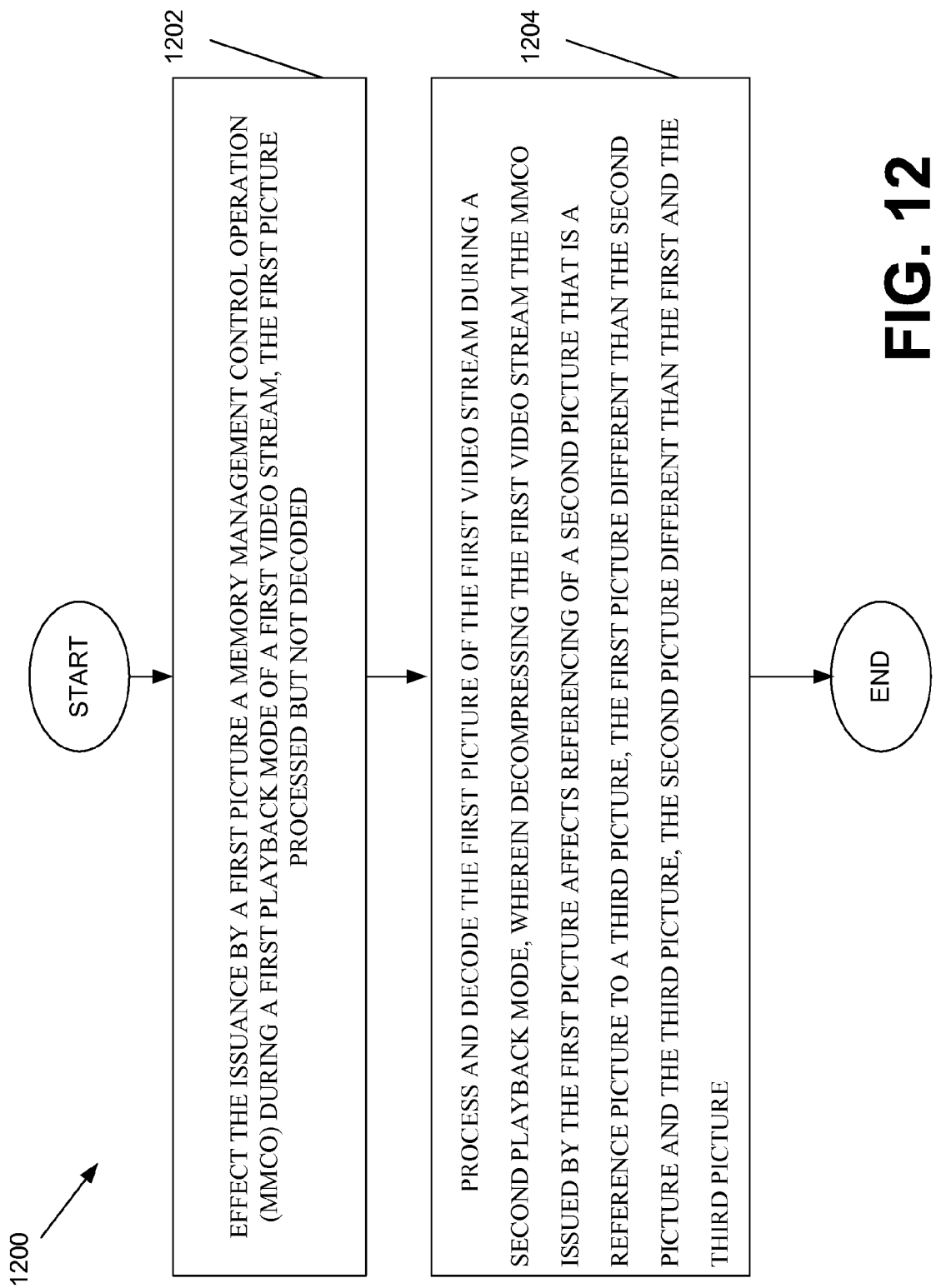

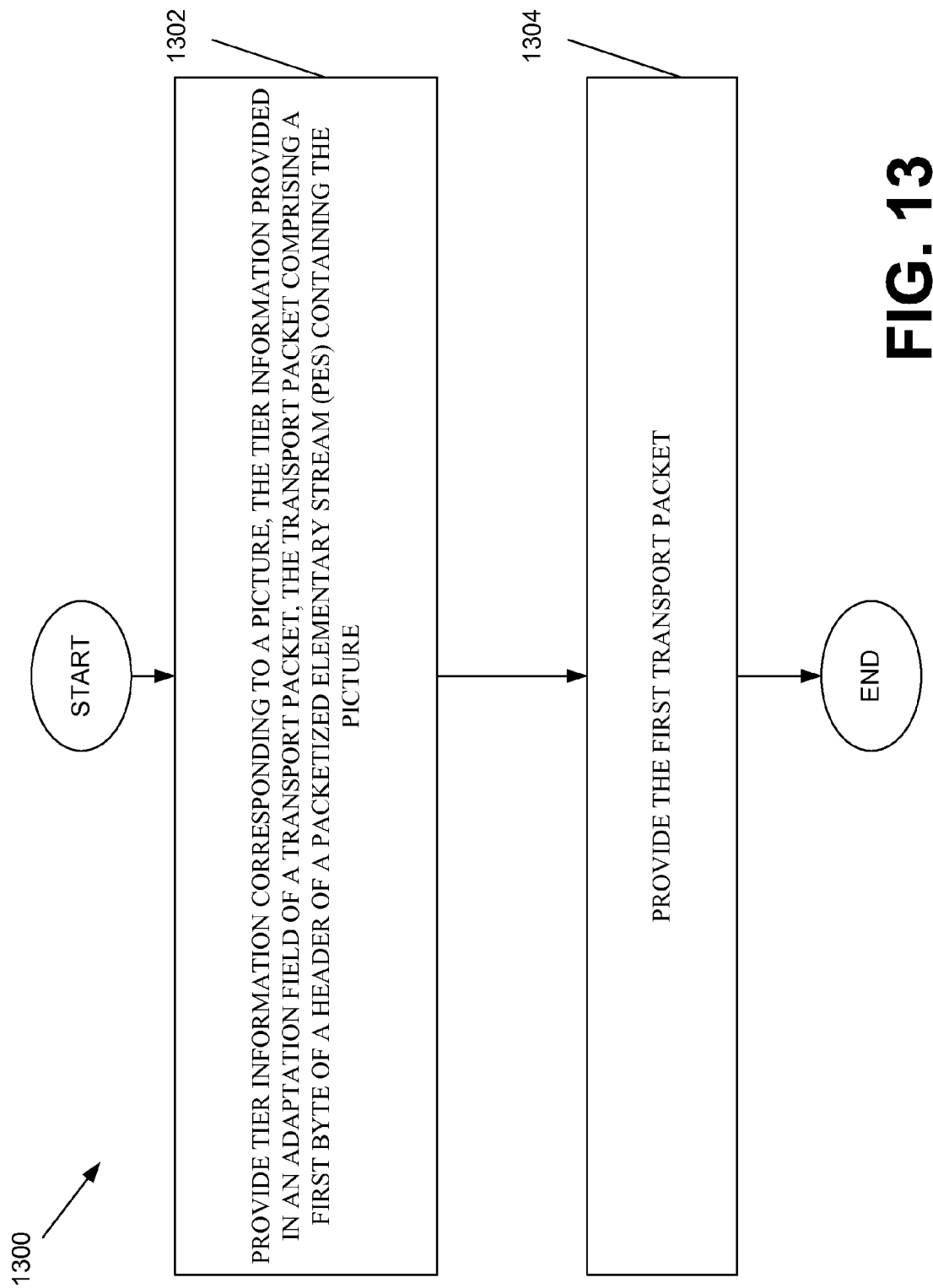

… (1)

SIGNALING TIER INFORMATION TO ASSIST MMCO STREAM MANIPULATION

CROSS-REFERENCE TO RELATED APPLICATIONS

This application is a continuation of U.S. patent application Ser. No. 12/483,925, filed Jun. 12, 2009, now U.S. Pat. No. 8,886,022 issued Nov. 11, 2014, which claims the priority of U.S. Provisional Patent Application No. 61/061,057, filed Jun. 12, 2008, both of which are entirely incorporated herein by reference.

TECHNICAL FIELD

The present disclosure relates generally to processing of video streams.

BACKGROUND

The implementation of digital video with an advanced video compression method is expected to extend the same level of usability and functionality that established compression methods extend to applications and network systems. Video processing devices throughout the network systems should continue to be provisioned with existing levels of video stream manipulation capabilities or better.

When providing video stream manipulation functionality for video streams compressed and formatted in accordance with the Advanced Video Coding (AVC) standard, referred to herein as AVC streams, it becomes difficult to determine whether the video stream is suitable for a particular stream manipulation operation or for operations extending end user functionality such as different video playback modes. Likewise, it becomes difficult for video processing equipment located at any of several locations throughout a network system to fulfill manipulation operations on AVC streams. This is because the AVC standard generally has a rich set of compression tools and can exploit temporal redundancies among pictures in more elaborate and comprehensive ways than prior video coding standards.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

FIG. 5 is a block diagram of various approaches to providing information pertaining to picture interdependency tiers.

FIGS. 6-10 are block diagrams that illustrates various embodiments of providing tier information in a data field.

FIG. 12 is a flow diagram that illustrates an example method embodiment for providing a tier information in a transport stream.

FIG. 13 is a flow diagram that illustrates an example method embodiment for receiving and processing tier information in a transport stream.

DESCRIPTION OF EXAMPLE EMBODIMENTS

Overview

Figure 1:
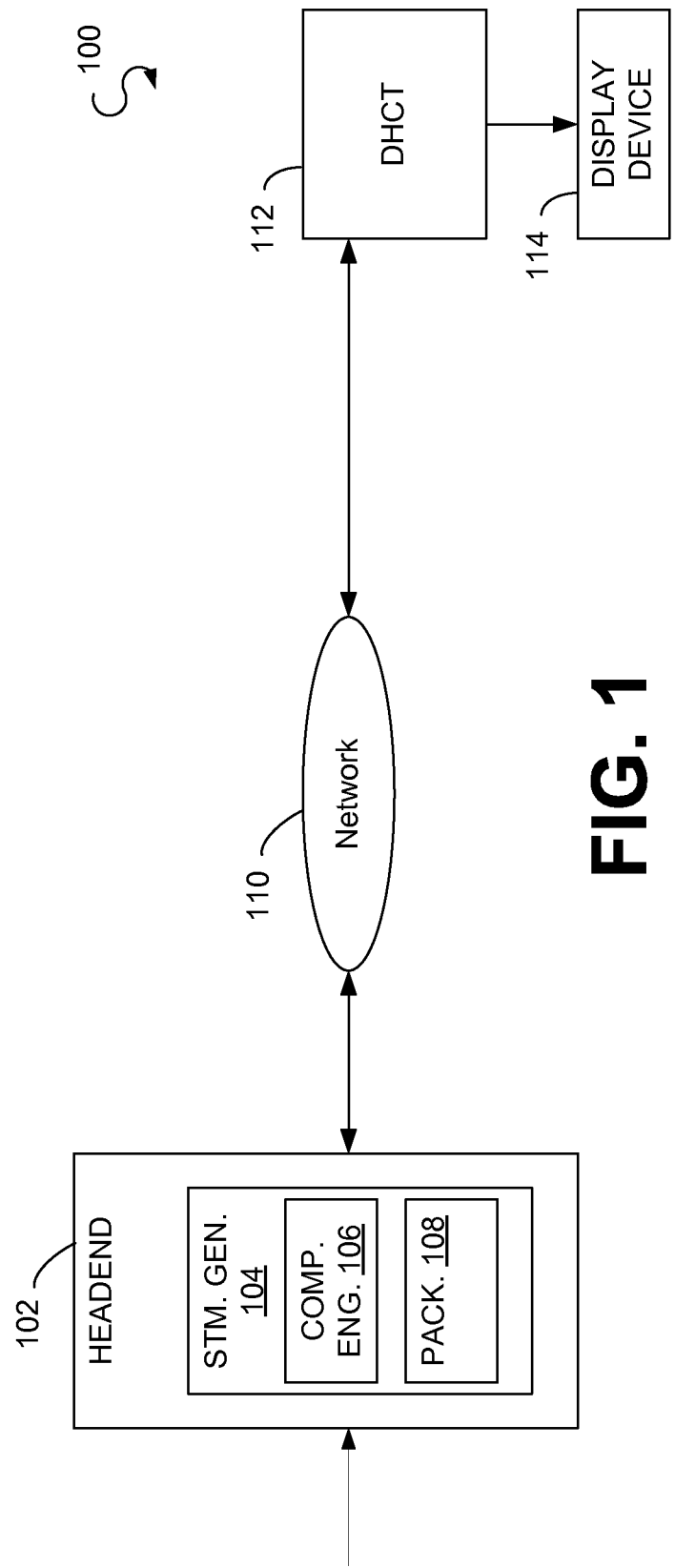
FIG. 1 is a high-level block diagram depicting an example environment in which an embodiment of systems and methods that implement processing of compressed video and information identifying pictures in respective picture interdependency tiers.

In one embodiment, a method that provides tier information corresponding to a picture, the tier information provided in an adaptation field of a transport packet, the transport packet comprising a first byte of a header of a packetized elementary stream (PES) containing the picture; and provides the first transport packet.

Example Embodiments

Certain embodiments are disclosed herein that provide, receive, and/or process information conveyed in a transport stream (e.g., the transport stream compliant to MPEG-2) that assists in, among other operations, personal video recording (PVR) operations and decoded picture buffer management. In particular, system and method embodiments are disclosed that provide, receive, and or process information residing at the transport level in a data field, the data field referred to herein also as a tier assertion byte. The information pertains to picture interdependency tiers, memory management control operations (MMCO), and/or other information (e.g., picture information). Although expressed herein as a tier assertion byte, it should be understood in the context of the present disclosure that any of other data fields or mechanisms of bit or byte management may be employed in some embodiments. In addition, reference herein to the tier assertion byte and information corresponding to the tier assertion byte, as well as other information in the transport layer of a compressed video stream (e.g., that conveys the minimum number of independently decodable pictures per a defined time period) is referred to herein also generally as assist information or related tier information. Further, although a data field is described herein using a tier assertion byte, it should be appreciated that the data field is not limited in size to a byte, but may encompass in some embodiments other sizes of data fields. Also, flags or subfields are used in the disclosure as partitions of the data field to which respective information may be signaled.

Throughput this specification, tiers should be understood to refer to picture interdependency tiers. Interdependency tiers provide a mechanism to identify sub-sequences that can be decoded (or extracted) independently of other pictures (e.g., starting from an SRAP). Such picture interdependencies may be conveyed by a respective tier level or layer (e.g., designated as a tier number). For instance, in one scheme, a tier-one (Tier 1 or $T_1$) level or layer or number consists of pictures that are decodable independent of pictures in Tiers 2 through T. Similarly, a tier-two (Tier 2 or T2) level or layer or number consists of pictures that are decodable independent of pictures in Tiers 3 through T, and so on. From another perspective, a Tier T picture may be viewed as pictures that are discardable without affecting the decodability of pictures in Tiers 1 through T−1. Similarly, a Tier (T−1) level or layer or number consists of pictures that are discardable without affecting the decodability of pictures in Tiers 1 through (T−2), and so on. Further explanation of interdependency tiers and/or the signalling of the same may be found in commonly-assigned U.S. Patent Application Publication No. 20080260045, entitled, "Signalling and Extraction in Compressed Video of Pictures Belonging to Interdependency Tiers."

In addition, a description of the MPEG-2 Video Coding standard can be found in the following publication: (1) ISO/IEC 13818-2, (2000), "Information Technology—Generic coding of moving pictures and associated audio—Video." A description of the AVC video coding standard can be found in the following publication: (2) ITU-T Rec. H.264 (2005), "Advanced video coding for generic audiovisual services." A description of MPEG-2 Systems for transporting AVC video streams in MPEG-2 Transport packets can be found in the following publications: (3) ISO/IEC 13818-1, (2000), "Information Technology—Generic coding of moving pictures and associated audio—Part 1: Systems," and (4) ITU-T Rec. H.222.0|ISO/IEC 13818-1:2000/AMD.3, (2004), "Transport of AVC video data over ITU-T Rec. H222.0|ISO/IEC 13818-1 streams."

In one embodiment, tier information corresponding to a picture is provided in the adaptation field of an MPEG-2 transport packet to signal the tier number associated with the picture that has its PES (packetized elementary stream) header starting in the first byte of that MPEG-2 trasnport packet's payload. A tier assertion byte conveys tier information. A tier assertion byte includes one flag or subfield (flag and subfield used interchangeably herein) among plural subfields that is asserted (e.g., set to a value of "1") to associate the corresponding picture with a given tier number. In other words, information in the data field signals a tier number. The ordering of at least a portion of the subfields may be according to increasing tier number ($T_1$, $T_2$, etc.) or decreasing tier number ($T_8$, $T_7$, etc.). In some embodiments, such ordering (e.g., increasing or decreasing) is signaled by an assertion of a subfield of the data assertion byte (i.e., information signals ordering of tier numbers).

In some embodiments, in addition to the tier information corresponding to a picture, information pertaining to MMCO is provided in the adaptation field of the same MPEG-2 transport packet. That is, the data field or tier assertion byte includes a subfield that asserts if an MMCO command is issued with the corresponding picture. In accordance with the AVC (H.264) specification, when decoding a first picture that issues an MMCO command, the reference pictures in the Decoded Picture Buffer (DPB) are affected. Consequently, the referencing of reference pictures that are subsequent to the first picture in the video stream is correct in accordance with the AVC specification. For instance, reference pictures in the DPB are kept rather than allow the sliding window bumping process to remove them from the DPB. Consequently, if the first picture is bypassed during a trick mode operation (i.e., a playback speed or mode other than the normal playback mode), the referencing of reference pictures in the decompression and reconstruction of a second picture after the first picture would be affected. Thus, to enable trick mode operation support the tier numbering is such that (1) a picture that depends on a reference picture cannot have a lower (e.g., smaller) number tier than the reference picture, and (2) a picture that depends on a picture issuing an MMCO command that affects its referencing cannot have a lower number tier than the picture issuing the MMCO command. Otherwise, the picture is not considered extractable and decodable (e.g., for a trick mode operation). Further, a picture issuing an MMCO command affecting references may be processed at the slice level, yet not decoded, e.g., during a trick mode operation as explained further below.

In some embodiments, related tier information includes one or more subfields that identifies a subsequent picture (i.e., information in the data field signals a subsequent picture) belonging to the same tier number as the picture to which the related tier information is associated or indicates that no such identification is present. In one embodiment, the identification may embody a number of pictures away from the current picture.

In some embodiments, a tier assertion byte may be configured according to two or more of the embodiments described above. Further, some embodiments may signal information that is additive to, or in lieu of, the information expressed above, including whether the corresponding picture is a forward predicted picture. For instance, in one embodiment, information may be provided (e.g., as an extra byte at an SRAP) that conveys the minimum number of independently decodable pictures per a defined time period (e.g., per second), irrespective of a given trick mode (e.g., playback) speed.

It is noted that "picture" is used throughout this specification to refer to an image portion or complete image from a sequence of pictures that constitutes video, or digital video, in one of a plurality of forms. Throughout this specification, video programs or other references to visual content should be understood to include television programs, movies, or any other signals that convey or define visual content such as, for example, those provided by a personal video camera. Such video programs, when transferred, may include compressed data streams corresponding to an ensemble of one or more sequence of pictures and other elements that include video, audio, and/or other data, multiplexed and packetized into a transport stream, such as, for example, a transport stream compliant to MPEG-2 Transport. Although operations are described herein with respect to a "picture," any other collection of data may be similarly used such a group of pictures, a block, macroblock, slice or other picture portion, etc.

A video stream may further refer to the compressed digital visual data corresponding to any video service or digital video application, including but not limited to, a video program, a video conferencing or video telephony session, any digital video application in which a video stream is transmitted or received through a communication channel in a network system, or any digital video application in which a video stream is stored in or retrieved from a storage device or memory device.

The disclosed embodiments may be embodied in many different forms and should not be construed as limited to the embodiments set forth herein; rather, these embodiments are provided so that this disclosure will be thorough and complete, and will fully convey the scope of the disclosure to those having ordinary skill in the art.

FIG. 1 is a high-level block diagram depicting an example environment in which an embodiment of systems and methods that implement processing of compressed video and information identifying pictures in respective picture interdependency tiers. In particular, FIG. 1 is a block diagram that depicts an example subscriber television system (STS) 100. In this example, the STS 100 includes a headend 102 and one or more digital home communication terminals (DHCTs), such as DHCT 112, that are coupled via a network 110. In one embodiment, the headend 102 includes a transport stream generator 104. The transport stream generator 104 comprises a compression engine 106 and a packetizer 108, which are collectively configured to generate a portion of a transport stream containing a video stream, such as an AVC stream, and assist information (i.e., related tier information).

In some embodiments, the generation of the transport stream may occur upstream (or downstream, e.g., at a node) of the headend 102. In some embodiments, related tier information may be generated at the DHCT 112, both provided in a transport stream. In some embodiments, both are provided in a program stream. In still some embodiments, transport streams may be generated at the headend 102 and the DHCT 112.

Figure 2:
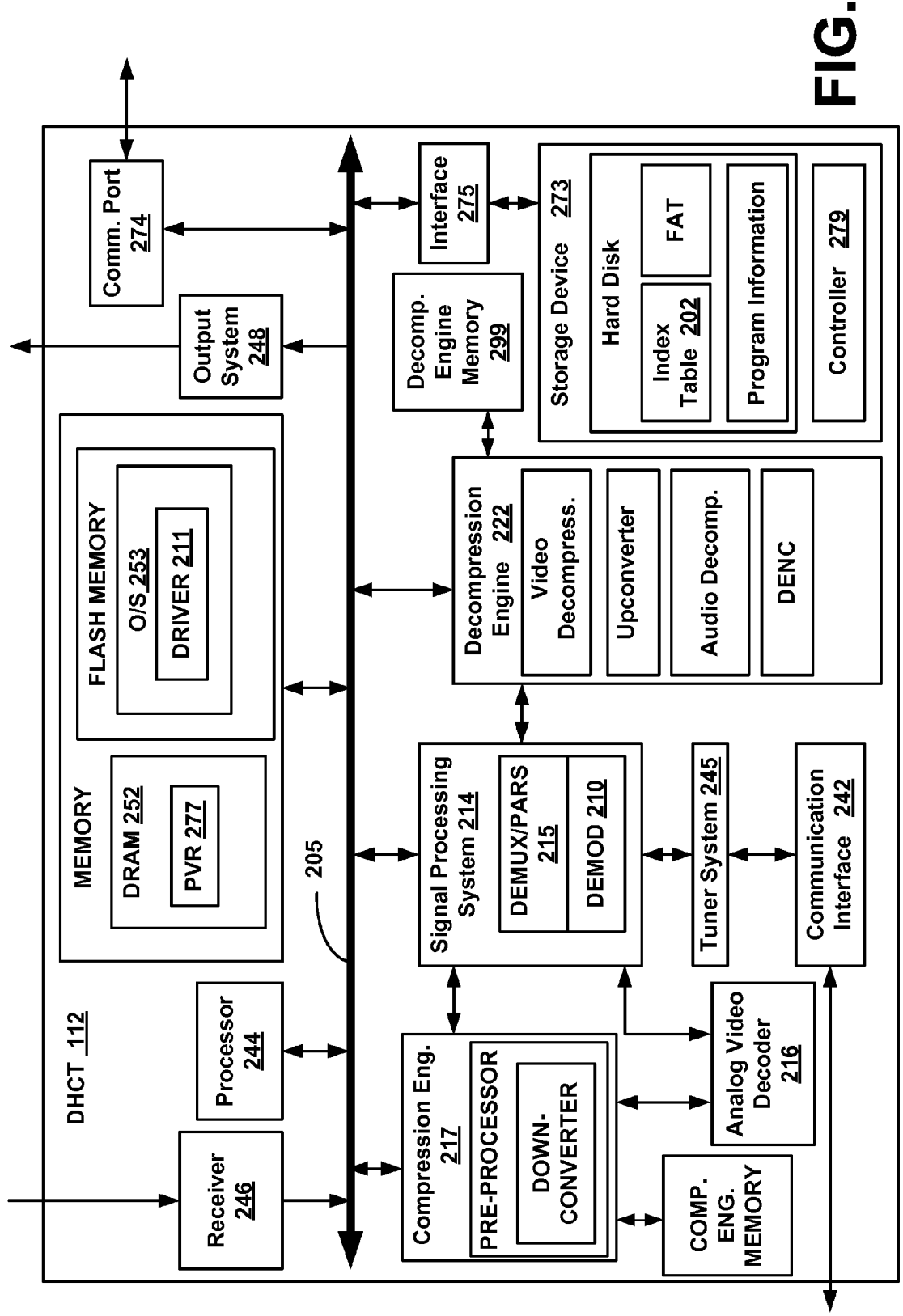
FIG. 2 is a block diagram of an embodiment of a digital home communication terminal (DHCT) as depicted in FIG. 1 and related equipment, in which an embodiment of systems and methods that implement at least in part processing of compressed video and information identifying pictures in respective picture interdependency tiers.

The compression engine 106 (the description of which may also apply in some embodiments to the compression engine 217 of FIG. 2, among others) receives as input a video signal 116, such as a digitized uncompressed video signal or a decompressed video signal. The compression engine 106 outputs a compressed video stream, such as an AVC video stream, and/or other data (e.g., related tier information), wherein compressed pictures of the compressed video stream are provided in the video stream in transmission order. Packetizer 108 packetizes the AVC video stream to output a stream of packets.

The headend 102 and the DHCT 112 cooperate to provide a user with television services including, for example, broadcast video programs, an interactive program guide (IPG), and/or video-on-demand (VOD) presentations, among others. The television services are presented via the display device 114, which is typically a television set that, according to its type, is driven with an interlaced scan video signal or a progressive scan video signal. However, the display device 140 may also be any other device capable of displaying video images including, for example, a computer monitor. Although shown communicating with a display device 140, the DHCT 112 may communicate with other devices that receive, store, and/or process video streams from the DHCT 112, or that provide or transmit video streams or uncompressed video signals to the DHCT 112.

The network 130 may include any suitable medium for communicating video and television service data including, for example, a cable television network or a satellite television network, among others. The headend 102 may include one or more server devices (not shown) for providing video, audio, and other types of media or data to client devices such as, for example, the DHCT 112.

The DHCT 112 is typically situated at a user's residence or place of business and may be a stand-alone unit or integrated into another device such as, for example, a display device 140 or a personal computer (not shown), among other devices. The DHCT 112 receives signals (video, audio and/or other data) including, for example, digital video signals in a compressed representation of a digitized video signal such as, for example, AVC streams modulated on a carrier signal, and/or analog information modulated on a carrier signal, among others, from the headend 102 through the network 130, and provides reverse information to the headend 102 through the network 130.

Although a DHCT is used as an example device throughout the specification, particular embodiments described herein extend to other types of receivers with capabilities to receive and process AVC streams. For instance, particular embodiments are applicable to hand-held receivers and/or mobile receivers that are coupled to a network system via a communication channel. Certain embodiments described herein also extend to network devices (e.g., encoders, switches, etc.) having receive and/or transmit functionality, among other functionality. Particular embodiments are also applicable to any video-services-enabled receiver (VSER) and further applicable to electronic devices such as media players with capabilities to process AVC streams, independent of whether these electronic devices are coupled to a network system. Furthermore, all embodiments, illustrations and examples given herein are intended to be non-limiting, and are provided as an example list among other examples contemplated but not shown.

FIG. 2 is a block diagram of an embodiment of a DHCT 112 as depicted in FIG. 1 and related equipment, in which an embodiment of systems and methods that implement at least in part processing of compressed video and related tier information. It should be understood that the DHCT 112 shown in FIG. 2 is merely illustrative and should not be construed as implying any limitations upon the scope of the disclosure. For example, in some embodiments, the DHCT 112 may have fewer, additional, and/or different components than the components illustrated in FIG. 2. Any of the described subsystems or methods of DHCT 112 and/or stream generator 104 can comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

The DHCT 112 preferably includes a communications interface 242 for receiving signals (video, audio and/or other data) from the headend 102 (FIG. 1) through the network 130 (FIG. 1), and provides reverse information to the headend 102.

The DHCT 112 may further include one or more processors (one processor 244 is shown) for controlling operations of the DHCT 112, an output system 248 for driving the television display 140 (FIG. 1), and a tuner system 245 for tuning to a particular television channel and/or frequency and for sending and receiving various types of data to/from the headend 102 (FIG. 1). The DHCT 112 may include, in some embodiments, multiple tuners for receiving downloaded (or transmitted) data. The tuner system 245 can select from a plurality of transmission signals provided by the subscriber television system 100 (FIG. 1). The tuner system 245 enables the DHCT 112 to tune to downstream media and data transmissions, thereby allowing a user to receive digital media content via the subscriber television system 100. In one embodiment, analog TV signals can be received via tuner system 245. The tuner system 245 includes, in one implementation, an out-of-band tuner for bi-directional data communication and one or more tuners (in-band) for receiving television signals. Additionally, a receiver 246 receives externally-generated user inputs or commands from an input device such as, for example, a remote control device (not shown).

The DHCT 112 may include one or more wireless or wired interfaces, also called communication ports or interfaces 274, for receiving and/or transmitting data or video streams to other devices. For instance, the DHCT 112 may feature USB (Universal Serial Bus), Ethernet, IEEE-1394, serial, and/or parallel ports, etc. The DHCT 112 may be connected to a home network or local network via communication interface 274. The DHCT 112 may also include an analog video input port for receiving analog video signals. User input may be provided via an input device such as, for example, a hand-held remote control device or a keyboard.

The DHCT 112 includes at least one storage device 273 for storing video streams received by the DHCT 112. A PVR application 277, in cooperation with operating system 253 and device driver 211, effects among other functions, read and/or write operations to/from the storage device 273. The processor 244 may provide and/or assist in control and program execution for operating system 253, device driver 211, applications (e.g., PVR 277), and data input and output. The processor 244 may further provide and/or assist in receiving and processing related tier information, identifying and extracting of pictures belonging respectively to one or more tiers, identifying and discarding of pictures belonging respectively to one or more tiers, and decoding and outputting a video stream after the extraction or discarding of identified pictures. The processor 244 may further assist or provide related tier information for a received compressed video stream or compressed video stream produced by DHCT 112. Herein, references to write and/or read operations to the storage device 273 can be understood to include operations to the medium or media of the storage device 273. The device driver 211 is generally a software module interfaced with and/or residing in the operating system 253. The device driver 211, under management of the operating system 253, communicates with the storage device controller 279 to provide the operating instructions for the storage device 273. As conventional device drivers and device controllers are well known to those of ordinary skill in the art, further discussion of the detailed working of each will not be described further here.

The storage device 273 may be located internal to the DHCT 112 and coupled to a common bus 205 through a communication interface 275. The communication interface 275 may include an integrated drive electronics (IDE), small computer system interface (SCSI), IEEE-1394 or universal serial bus (USB), among others. Alternatively or additionally, the storage device 273 may be externally connected to the DHCT 112 via a communication port 274. The communication port 274 may be according to the specification, for example, of IEEE-1394, USB, SCSI, or IDE. In one implementation, video streams are received in the DHCT 112 via communications interface 242 and stored in a temporary memory cache (not shown). The temporary memory cache may be a designated section of DRAM 252 or an independent memory attached directly, or as part of a component in the DHCT 112. The temporary cache is implemented and managed to enable media content transfers to the storage device 273. In some implementations, the fast access time and high data transfer rate characteristics of the storage device 273 enable media content to be read from the temporary cache and written to the storage device 273 in a sufficiently fast manner. Multiple simultaneous data transfer operations may be implemented so that while data is being transferred from the temporary cache to the storage device 273, additional data may be received and stored in the temporary cache.

The DHCT 112 includes a signal processing system 214, which comprises a demodulating system 210 and a transport demultiplexing and parsing system 215 (herein demultiplexing system) for processing broadcast and/or on-demand media content and/or data. One or more of the components of the signal processing system 214 can be implemented with software, a combination of software and hardware, or in hardware. The demodulating system 210 comprises functionality for demodulating analog or digital transmission signals.

An encoder or compression engine, as explained above in association with FIG. 1, may reside at the headend 110 (e.g., embodied as compression engine 106), in the DHCT 112 (e.g., embodied as compression engine 217), or elsewhere. The compression engine 217 can receive a digitized uncompressed video signal, such as, for example, one provided by analog video decoder 216, or a decompressed video signal produced by a decompression engine (e.g., decompression engine 222) as a result of decompressing a compressed video signal. In one embodiment, digitized pictures and respective audio output by the analog video decoder 216 are presented at the input of the compression engine 217, which compresses the uncompressed sequence of digitized pictures according to the syntax and semantics of a video compression specification. Thus, the compression engine 217 implements a video compression method or algorithm that corresponds to a respective video compression specification, such as the AVC standard, to provide a video stream. The compression engine 217 may further provide assist information or related tier information for the provided video stream.

The systems and methods disclosed herein are applicable to any video compression method performed according to a video compression specification allowing for at least one type of compressed picture that can depend on the corresponding decompressed version of each of more than one reference picture for its decompression and reconstruction. For example, the compression engine 217 (or 106) may compress the input video according to the specification of the AVC standard and produce an AVC stream containing different types of compressed pictures, some that may have a first compressed portion that depends on a first reference picture for their decompression and reconstruction, and a second compressed portion of the same picture that depends on a second and different reference picture.

In some embodiments, a compression engine with similar compression capabilities, such as one that can produce AVC streams, is connected to the DHCT 112 via communication port 274, for example, as part of a home network. In another embodiment, a compression engine with similar compression capabilities, such as one that can produce AVC streams, may be located at the headend 102 or elsewhere in the network 130. The compression engine in the various embodiments may include capabilities to provide assist information or related tier information for a produced video stream.

Unless otherwise specified, a compression engine as used herein may reside at the headend 102 (e.g., as compression engine 106), in the DHCT 112 (e.g., as compression engine 217), connected to DHCT 112 via communication port 274, or elsewhere. Likewise, video processing devices as used herein may reside at the headend 102, in the DHCT 112, connected to the DHCT 112 via communication port 274, or elsewhere. In one embodiment, the compression engine and video processing device reside at the same location. In another embodiment, they reside at different locations. In yet another embodiment, the compression engine and video processing device are the same device.

The compressed video and audio streams are produced in accordance with the syntax and semantics of a designated audio and video coding method, such as, for example, MPEG-2 or AVC, so that the compressed video and audio streams can be interpreted by the decompression engine 222 for decompression and reconstruction at a future time. Each AVC stream is packetized into transport packets according to the syntax and semantics of transport specification, such as, for example, MPEG-2 transport defined in MPEG-2 systems. Each transport packet contains a header with a unique packet identification code, or PID, associated with the respective AVC stream.

The demultiplexing system 215 can include MPEG-2 transport demultiplexing capabilities. When tuned to carrier frequencies carrying a digital transmission signal, the demultiplexing system 215 enables the separation of packets of data, corresponding to the desired AVC stream, for further processing. Concurrently, the demultiplexing system 215 precludes further processing of packets in the multiplexed transport stream that are irrelevant or not desired, such as packets of data corresponding to other video streams. Parsing capabilities of the demultiplexing system 215 allow for the ingesting by the DHCT 112 of program associated information carried in the transport packets. Parsing capabilities of the demultiplexing system 215 may allow for ingesting by DHCT 112 of assist information, such as, for example, tier assertion byte information, related tier information, or information that assists in trick play operations.

In one embodiment, assist information or related tier information can be provided by specifying explicit information in the private data section of the adaptation field or other fields of a transport stream packet, such as that of MPEG-2 transport. In one embodiment, the signaling and provision of such information is at the video program's multiplex level, or the transport layer (rather than in the video layer—in other words, in the non-video coding layer). The assist information or related tier information can be carried as unencrypted data via, for example, private data carried in the adaptation field of MPEG-2 Transport packets.

For instance, a transport packet structure according to MPEG-2 comprises 188 bytes, and includes a 4-byte header with a unique packet identifier, or PID, that identifies the transport packet's corresponding stream. An optional adaptation field may follow the transport packet's header. The payload containing a portion of the corresponding stream follows the adaptation field, if present in the transport packet. If the adaptation field is not present, the payload follows the transport header. The related tier information corresponding to the compressed pictures in the AVC stream are provided, in one embodiment, in the adaptation field and thus not considered as part of the video layer since the adaptation field is not part of transport packet's payload nor part of the AVC specification but rather part of the syntax and semantics of MPEG-2 Transport in accordance with the MPEG-2 systems standard.

The header of a transport stream may include a sync byte that sets the start of a transport stream packet and allows transmission synchronization. The header of the transport stream may further include a payload unit start indicator that, when set to a certain value (e.g., 1b in MPEG-2 Transport) in the packets carrying the video stream, indicates that the transport packet's payload begins with the first byte of a packet of a packetized elementary stream (PES). Video streams carried in a PES may be constrained to carrying one compressed picture per PES packet, and that a PES packet commences as the first byte of a transport streams' packet payload. Thus, the payload unit start indicator provisions the identification of the start of each successive picture of the video stream carried in the transport stream. Note that the transport packets carrying the video stream are identified by the parsing capabilities of DHCT 112 (as described above) from program associated information or program specific information (PSI). For instance, in MPEG-2 Transport, program map tables identify the packet identifier (PID) of the video stream in the program map table (PMT), which in turn is identified via the program association table (PAT).

It should be noted that the related tier information is provided in the transport layer unencrypted and enables a video decoder or other video processing device located in a network to determine for a particular application or operation, such as a trick mode operation, which pictures to extract from the video stream, which pictures to discard from the video stream, the identity of the subsequent picture belonging to the same tier level as the picture associated with the tier information, and/or the minimum number of independently decodable pictures per defined time period, without having to parse the compressed video layer or video stream.

The related tier information identifies pictures in the video stream that belong respectively to one or more picture interdependency tiers. This in turn enables the annotation of the successive location of pictures corresponding to respective picture interdependency tiers, when the video program is stored in a hard-drive of the DHCT 112. The video program may be stored as a transport stream. In an alternate embodiment, it may be stored as a program stream. The annotated locations of pictures of the video program may be processed by processor 244 while executing the PVR application 277 to extract the pictures of the video program belonging to the lowest numbered tier (i.e, Tier 1) from a starting point, or to extract additional pictures belonging to each respective successive tier number from the same starting point (i.e., ascending numbered tiers, as described below) to provide a trick mode operation.

One or more flags in a transport packet header or in the adaptation field may identify starting points or random access points that may serve as starting points for tracking related tier information, such as the minimum number of independently decodable pictures per defined time period. For instance, the adaptation field in MPEG-2 Transport packets includes the random access indicator and the elementary stream priority indicator. Some information, such as the tier assertion byte, may be provided in association with every picture.

The components of the signal processing system 214 are generally capable of QAM demodulation, forward error correction, demultiplexing of MPEG-2 transport streams, and parsing of packets and streams. Stream parsing may include parsing of packetized elementary streams or elementary streams. Packet parsing may include parsing and processing of fields that deliver related tier information corresponding to the AVC stream. In some embodiments, parsing performed by signal processing system 214 extracts the related tier information and processor 244 provides processing and interpretation of the related tier information. In yet another embodiment, processor 244 performs parsing, processing, and interpretation of the related tier information. The signal processing system 214 further communicates with the processor 244 via interrupt and messaging capabilities of the DHCT 112. The processor 244 annotates the location of pictures within the video stream or transport stream as well as other pertinent information corresponding to the video stream. Alternatively or additionally, the annotations may be according to or derived from the assist information corresponding to the video stream. The annotations by the processor 244 enable normal playback as well as other playback modes of the stored instance of the video program. Other playback modes, often referred to as "trick modes," may comprise backward or reverse playback, forward playback, or pause or still. The playback modes may comprise one or more playback speeds other than the normal playback speed. In some embodiments, the assist information is provided to the decompression engine 222 by the processor 244. In another embodiment, the annotations stored in the storage device are provided to the decompression engine 222 by the processor 244 during playback of a trick mode. In yet another embodiment, the annotations are only provided during a trick mode, wherein the processor 244 has programmed the decompression engine 222 to perform trick modes.

Annotations may be simply assist information. Processor 244 can extract pictures from low numbered tiers and/or discard pictures from high numbered tiers as further described below.

The packetized compressed streams can also be outputted by the signal processing system 214 and presented as input to the decompression engine 222 for audio and/or video decompression. The signal processing system 214 may include other components (not shown), including memory, decryptors, samplers, digitizers (e.g., analog-to-digital converters), and multiplexers, among others. The demultiplexing system 215 parses (e.g., reads and interprets) transport packets, and deposits the information corresponding to the assist information corresponding to the AVC stream into DRAM 252.

Upon effecting the demultiplexing and parsing of the transport stream, the processor 244 interprets the data output by the signal processing system 214 and generates ancillary data in the form of a table or data structure (index table 202) comprising the relative or absolute location of the beginning of certain pictures in the compressed video stream in accordance with the assist information corresponding to the video stream. The processor 244 also processes the information corresponding to the assist information to make annotations for PVR operations. The annotations are stored in the storage device by the processor 244. In one embodiment, the assist information comprises of the annotations and it is stored in the hard drive. Such ancillary data is used to facilitate the retrieval of desired video data during future PVR operations.

The demultiplexing system 215 can parse the received transport stream (or the stream generated by the compression engine 217, which in some embodiments may be a program stream) without disturbing its video stream content and deposit the parsed transport stream (or generated program stream) into the DRAM 252. The processor 244 can generate the annotations even if the video program is encrypted because the assist information of the AVC stream is carried unencrypted. The processor 244 causes the transport stream in DRAM 252 to be transferred to a storage device 273. Additional relevant security, authorization and/or encryption information may be stored. Alternatively or additionally, the assist information corresponding to the AVC stream may in the form of a table or data structure comprising the interdependencies among the pictures, as explained further below.

Note that in one embodiment, reference herein to a decoding system comprises decoding functionality and cooperating elements, such as found in the collective functionality of the decompression engine 222, processor 244, signal processing system 214, and memory. In some embodiments, the decoding system can comprise fewer, greater, or different elements. Further, certain system and method embodiments include components from the headend (e.g., the compression engine 106, etc.) and/or components from the DHCT 112, although fewer or greater amount of components may be found in some embodiments.

AVC streams, or other compressed video streams, comprise pictures that may be encoded according to a hierarchy of picture interdependencies, or tiers of picture dependencies. Pictures are associated with hierarchy of tiers based on picture interdependencies. Each compressed picture belongs to at most one tier. Tiers are numbered sequentially starting with tier number 1. Pictures having the lowest tier number do not depend for their decompression and reconstruction on pictures having any higher numbered tier. Thus, assist information is to be provided consistent identification, such that any identified picture corresponding to a tier is not dependent on pictures belonging to any higher numbered tier. Another aspect of the hierarchy of tiers is that decoding of some pictures depends on particular other pictures. Therefore, if one picture serves as a reference picture to other pictures, it can be considered more important than other pictures. In fact, a particular set of pictures can be viewed in a hierarchy of importance, based on picture interdependencies.

One embodiment of a stream generator 104 selects I and IDR-pictures for inclusion in the lowest numbered tier. Another embodiment also includes forward predicted pictures in the lowest numbered tier. An anchor picture can be an I-picture, IDR-picture, or a FPP (forward predicted picture) that depends only on a past reference pictures. In some embodiments, an FPP is an anchor picture if it only depends on the most-recently decoded anchor picture.

Pictures can be categorized as belonging a particular picture interdependency tier or "level" or number, and some embodiments of a stream generator may include assist information for tiers above a certain tier of the hierarchy (e.g., the two lowest numbered tiers). In another embodiment, assist information may be provided only for tiers below a particular tier of the hierarchy (e.g., the two highest tier numbers). In yet another embodiment, assist information may be provided only for high numbered tiers, for low numbered tiers a, or for a combination of both low numbered tiers and high numbered tiers. Assist information may be provided starting from the tier 1, and/or starting from the the highest number tier. A picture's corresponding tier may be understood as a measure of its importance in decoding other pictures—some reference pictures are more important than other reference pictures because their decoded and reconstructed information propagates through more than one level of referencing.

A person of ordinary skill in the art should also recognize that although AVC picture types are used in this disclosure, the systems and methods disclosed herein are applicable to any digital video stream that compresses one picture with reference to another picture or pictures.

An AVC stream is used as an example throughout this specification. However, particular embodiments are also applicable to any compressed video stream compressed according to a video compression specification allowing for: (1) any picture to be compressed by referencing more than one other picture, and/or (2) any compressed picture that does not deterministically convey or imply its actual picture-interdependency characteristics from its corresponding picture-type information in the video stream.

Figure 3:
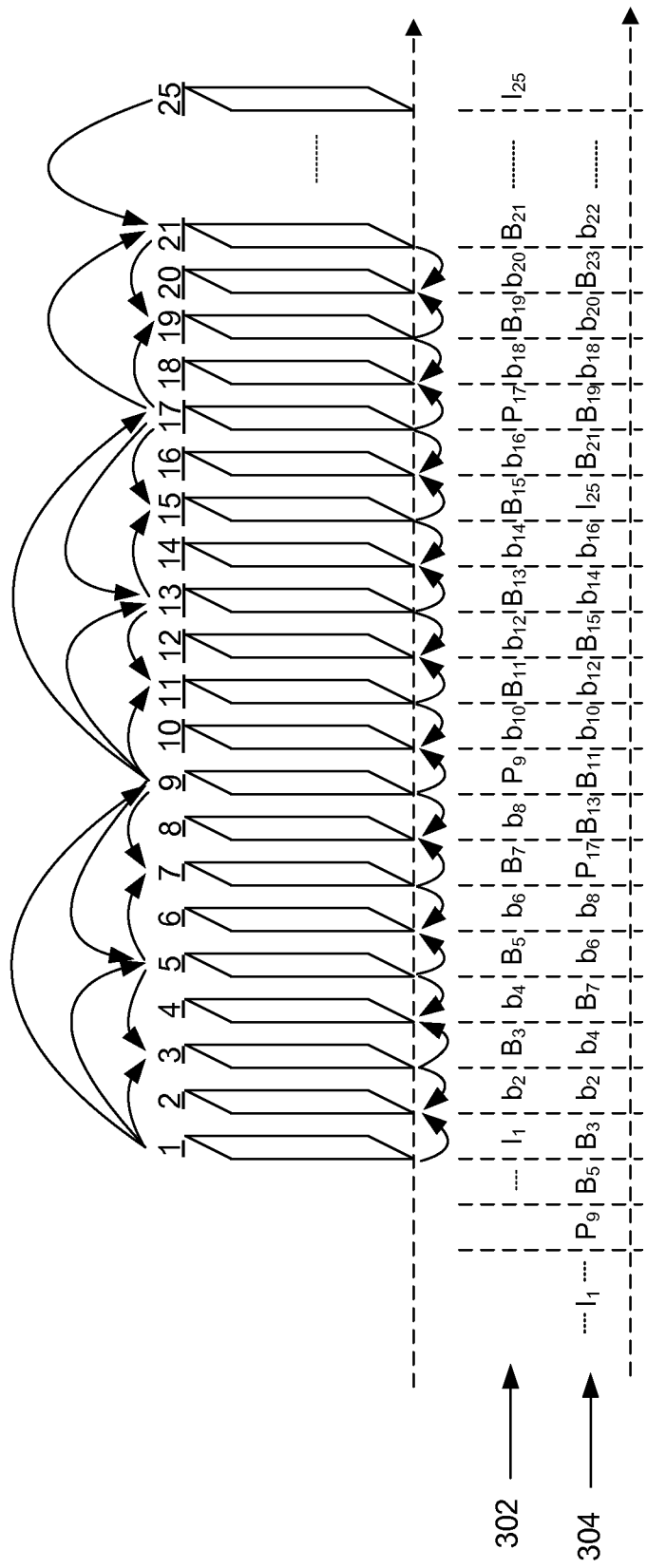
FIG. 3 is a block diagram that illustrates picture interdependencies in an example sequence of compressed pictures provided by a transport stream generator.

Attention is now directed to FIG. 3, which is a block diagram that illustrates picture interdependencies in an example sequence of compressed pictures provided by the transport stream generator 104. The first row 302 of FIG. 3 comprises the output order of an exemplary GOP, such as received and decoded in decode order 304 (i.e., transmission order) at the decompression engine 222. The GOP comprises a sequence of compressed pictures (designated by picture types, such as I, P, or B). The picture interdependencies are shown, in part, by the arrows above and below each picture (pictures numbered 1-25 at the top of each respective picture). An arrow tail shown at a picture depicts that that picture serves as a reference picture to the other picture where the corresponding arrow head is shown. That is, the arrow conveys that the other picture is predicted from the reference picture. For instance, in FIG. 3, picture 3 is predicted from (and hence depends from) picture 1 and picture 5. Although shown described having a similar pattern of dependency between bounds (e.g., between pictures 1 and 9, and pictures 9 and 17), one having ordinary skill in the art should appreciate that different patterns and/or dependencies can be found from one bounded group to the next.

Beneath row 302 of FIG. 3 is the decode order 304, corresponding to the order in which the pictures are decoded for reconstruction at the decompression engine 222. The transmission order of pictures is different than the output or display order due to the need to have the reference pictures prior to decoding a picture. Note that P pictures can be forward predicted or backwards predicted, and typically, that fact is not evident until the pictures are decoded. For instance, knowledge of the picture type (e.g., as ascertained by a header) does not necessarily convey how prediction is employed or picture interdependencies.

In MPEG-2, discardable pictures can be output immediately (no need to retain), though typically, for implementation reasons, such pictures are temporarily stored for at least a picture period or interval. In AVC streams, even with discardable pictures (i.e, non-reference pictures), there are circumstances where the output of the discardable, decoded picture is delayed and hence retained in the decoded picture buffer (DPB).

Figure 4:
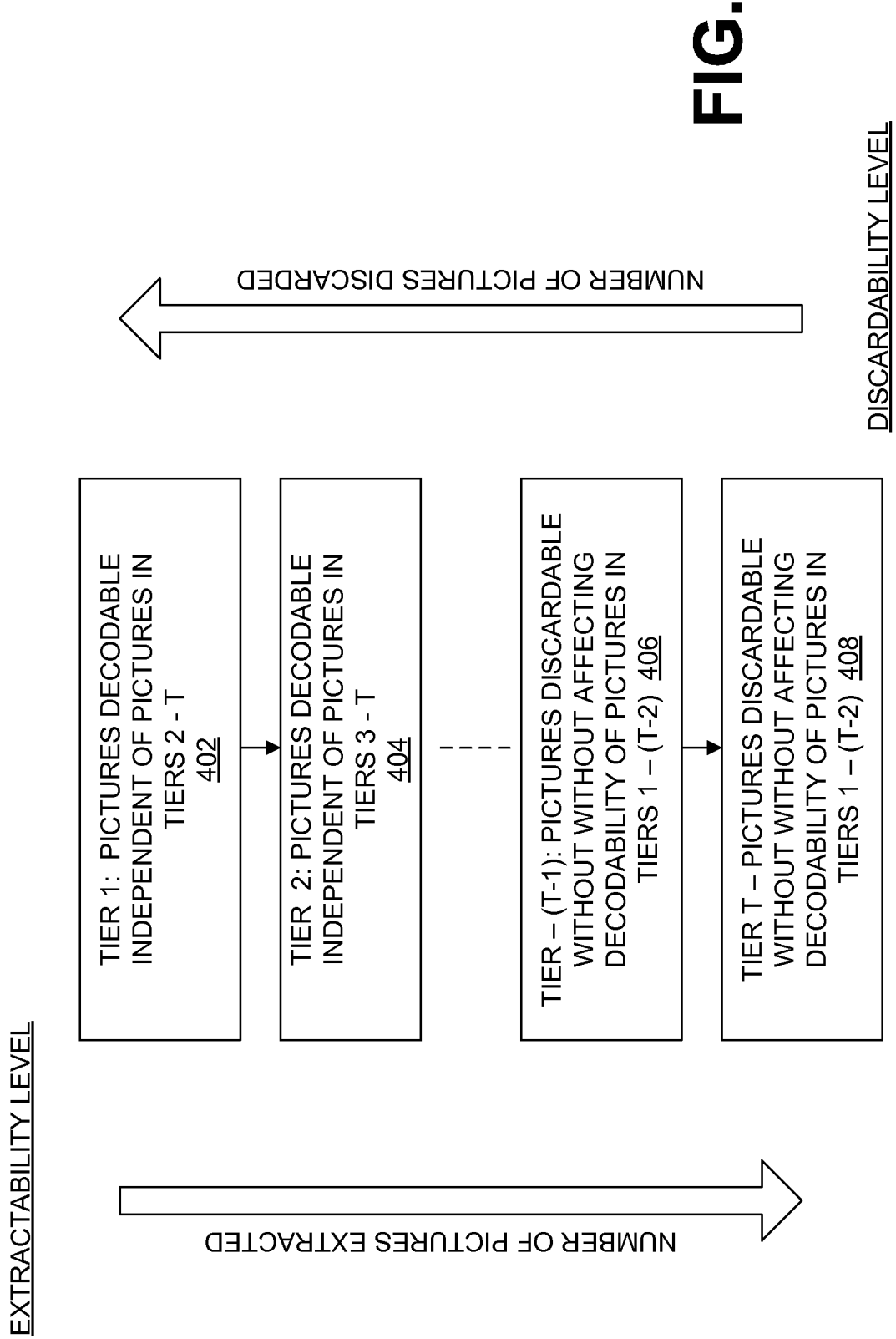
FIG. 4 is a block diagram that illustrates a hierarchy of picture interdependency tiers.

Attention is now directed to an explanation of tiers as shown in FIGS. 4 and 5. FIG. 4 illustrates an example of the hierarchy of picture interdependency tiers. A hierarchy of picture interdependency tiers has "T" tiers, T being the highest number tier. A picture in a video stream can only belong to one of the T tiers. However, in some embodiments, the stream generator 104 may opt to not identify the pictures belonging to some middle tiers in its provided tier information. Tier 1 402 comprises of pictures in the video stream that can be decoded independently from pictures in Tiers 2 through T. Tier 1 is the first level of picture extraction. Each successive tier can be decoded independently from pictures in the video stream belonging to higher numbered tiers. For instance, the Tier 2 404 can be decoded independently of pictures belonging to tiers 3 through T. Tier 1 402 represents the first level of picture extractability. Picture extractability, the number of pictures that can be extracted from the video stream, increases from Tier 1 to Tier T, whereas picture discardability, the number of pictures that can be discarded or ignored from the video stream for a trick mode operation, increases from Tier T to Tier 1. Conversely, picture discardability decreases from Tier 1 to Tier T and picture extractability decreases from Tier T to Tier 1. Tier 1 402 comprises the first level of picture extractability and the last level of picture discardability. Tier T 408 comprises of the first level of picture discardability and the last level of picture extractability. Tier—(T−1) 406 comprises the $2^{nd}$ level of picture discardability and the next to last level of picture extractability, etc.

Accordingly, Tier 1 402 pictures comprise those pictures that are decodable independent of pictures in Tier 2 404 through Tier T 408. Tier 2 404 pictures are pictures that are decodable independent of pictures in Tiers 3 through T 408, and so on.

Pictures in Tier T 408, can be discarded without affecting the decodability of pictures remaining in the video streams that correspond to lower numbered tiers. Tier T 408 pictures are those that are discardable without affecting the decodability of pictures in Tiers 1 402 through (T−1) 406. Tier—(T−1) pictures are those that are discardable without affecting the decodability of the pictures remaining in the video stream that have Tiers 1 402 through T−2 (not shown).

Tier 1 402 comprises of coded pictures (e.g., compressed pictures) in the video stream that when extracted progressively from a starting point in the video stream, such as a random access point, can be decoded and output independently of other coded pictures in the video stream. Tier 2 404 comprises of coded pictures in the video stream that when extracted progressively from the same starting point in the video stream, in concert with the progressive extraction with pictures belonging to Tier 1 402, adds another level of picture extraction. Thus, Tier 1 402 and Tier 2 404 can be decoded and output independently of other coded pictures in the video stream, that is, independent of pictures "determined not to belong to" or "not identified" as Tier 1 402 or Tier 2 404 coded pictures. More generally, for any value of K from 1 to T, pictures belonging to Tiers 1 through K are identified or determined to belong to Tiers 1 through K from received or provided assist information at DHCT 112. Thus, if in a progressive manner "all" the pictures belonging to Tiers 1 through K are: (1) extracted from the video stream from a starting point, and (2) decoded, then the next picture in the video stream with a tier number less than or equal to K can be extracted and decoded because all of the pictures that it depends on for temporal prediction and/or for motion compensation or pictures that it references as reference pictures, or pictures that affect its references, will have been: (1) extracted from the video stream, (2) decoded and (3) available to be referenced.

It is noted that throughout this specification reference to a picture belonging to a tier or a picture in a tier is to be understood as a picture signaled with a tier number or a picture corresponding to a tier.

A Tier-K coded picture in the video stream can be extracted and guaranteed to be decoded into its intended complete and full reconstruction if extraction and decoding of all immediately-preceding Tier-K coded pictures has been performed progressively for a finite amount of time prior to the extraction of that particular Tier-K coded picture. This is because video coding may perform temporal references across GOP boundaries. In one embodiment, a Tier-K coded picture can be extracted and decoded in its intended complete and full reconstruction if all coded pictures belonging to tiers Tier 1 through Tier K have been extracted and decoded progressively since or for at least the last "n" Random Access Points (RAPs) in the video stream immediately prior to the particular Tier-K coded picture. For instance, if a playback mode or trick mode, such as a fast forward, is to commence from a particular or desired location of the video stream, if may be necessary to start decoding at the second RAP (i.e., n=2) prior to the particular location of the video stream. RAPs can be signaled and identified with one or more specific flags in the MPEG-2 Transport level or layer's header and/or the adaptation field header. For instance, specifications such as MPEG-2 Systems provisions indicators in the transport stream, such as a random access point indicator and/or an elementary stream priority indicator, that serve to signal a RAP. In one embodiment, the RAP refers to an access unit (or picture) in the AVC bitstream at which a receiver can start the decoding of the video stream. After the RAP, the video stream includes a sequence parameter set (SPS) and a picture parameter set (PPS) used for decoding the associated picture with the RAP (and pictures thereafter), and any other necessary parameters or set of parameters required to decode and output the pictures of the video stream. The random access points may carry an I picture or an IDR picture. In one embodiment, the GOP, typically an MPEG-2 term, is equivalent to the picture sequences and picture interdependencies found between two or more RAPs.

In one embodiment, start codes may be used to identify where a picture begins. For instance, the beginning of a picture in a PES packet may be aligned with the beginning of the payload of a transport packet. Hence, the beginning of a picture can be identified to enable the extraction (for decoding or discarding) of pictures. In some embodiments, information available at the transport level enables the identification of the beginning of pictures. For instance, for MPEG-2 transport stream packets carrying a video stream, the payload unit start indicator, may identify when the transport stream packet payload begins with the first byte of an MPEG-2 PES packet.

In some embodiments, a Tier-K coded picture can be extracted and decoded in its intended complete and full reconstruction if all coded pictures belonging to tiers Tier 1 through Tier K have been extracted and decoded progressively since or for at least the last "n" beginnings of Group of Pictures (GOPs) in the video stream immediately prior to the particular Tier-K coded picture.

Applying tiers to an example implementation, such as PVR, in an MPEG-2 video stream encoded with a common GOP where the pictures in output order are as follows: I B B P B B P B B P B B P and so on, Tier 1 402, may be sufficient. For example, I pictures may be exclusively utilized in fast forward or rewind operations. But suppose that a finer level of granularity is desired for trick modes, or for improved accuracy in placement or removal of a picture in the trick mode operations. A second and/or third tier may be added to allow for this improved functionality while handling the complexities of AVC. Note that depending on the desired trick mode functionality (e.g., speed, direction, etc.), one embodiment may decode pictures belonging to tier 1 (e.g., 15× trick modes). In some embodiments, decoding may be implemented with pictures from the tiers 1 and 2.

The related tier information and/or the identification of tiers can be implemented according to a variety of approaches, as illustrated in FIG. 5. In some embodiments, a bottom-up approach 502 can be implemented (e.g., via a decompression engine), wherein pictures are identified from the highest numbered tier (i.e., first discardability level pictures) and then proceeding to pictures in one or more of the successive descending numbered tiers of the tier hierarchy. In some embodiments, a top-down approach 504 may be implemented, where pictures are identified from the first extractability level and then to pictures in successive ascending numbered tiers of the tier hierarchy. In some embodiments, a hybrid approach 506 may be implemented, based on a combination of the bottom-up approach 502 and top-down approach 504.

Having provided a background on hierarchical tiers and the properties of the pictures belonging to the respective tiers, attention is now directed to a system and method that provides, receives, and/or processes related tier information. Referring to FIG. 6, shown is one embodiment of example tier information embodied as a tier assertion byte 600 that in one embodiment asserts only one subfield to assert a tier for an associated picture. That is, information in the data field (e.g., tier assertion byte 600) signals a tier. The tier assertion byte 600 is provided for a corresponding picture (e.g., a picture with a first byte of the PES header starting in a first byte of a transport packet payload). Note that a transport packet comprises a payload unit start indicator to enable ease of identifying a corresponding picture. In this example embodiment, the tier assertion byte 600 comprises a data field of subfields (or flags, where flags and subfields are used interchangeably herein) with a flag value of "1" to indicate or signal the asserted tier. Note that the tier assertion byte 600 comprises the potential for assertion of one of a plurality of tiers levels or numbers ($T_1$, $T_2$, $T_3$, etc.), the tier levels ordered (and hence processed) in the direction from the top 602 ($T_1$) to the bottom 604 ($T_8$). In other words, a subfield set at 602 is an indication that the lowest numbered tier is asserted for purposes of processing. Although shown with eight (8) tier levels, it should be appreciated that different numbers of tier levels may be used in some embodiments. Only one subfield is set with a value of "1" (asserted), corresponding to the lowest numbered tier 602. In other words, a picture is only allowed to be associated with a single tier. The tier assertion byte 600 enables the ready identification of pictures that can be decoded (e.g., at a DHCT 112) and/or extracted (e.g., at a network device, such as dropping of pictures) without having to interrogate the video coding layer for such information. Note that, as explained above, decoding of extractable or extracted pictures is feasible from a given starting point, such as a random access point as described above. For instance, by identifying for extraction pictures belonging to the set of lowest tier numbers, the pictures can be extracted sequentially from a RAP and decoded with the guarantee that all picture are capable of being decoded and reconstructed to their respective intended decompressed versions. Other purposes of a tier assertion byte include use for scalability, among other purposes. In one embodiment, the tier assertion byte 600 is provided at every picture, although in some embodiments, may be provided only for pictures having successive low tier numbers, starting with the lowest tier number, and in others, only for pictures having successive high tier numbers, including the highest tier number.

FIG. 7 shows another embodiment of a tier assertion byte 700, where the ordering is from 704 (e.g., $T_8$) to 702 (e.g., $T_1$). In other words, a device (e.g., a codec) may process the tier assertion byte 700 with the expectation, in one embodiment, that the processing is understood to be according to that particular approach (depicted from bottom to top).

Figure 8:
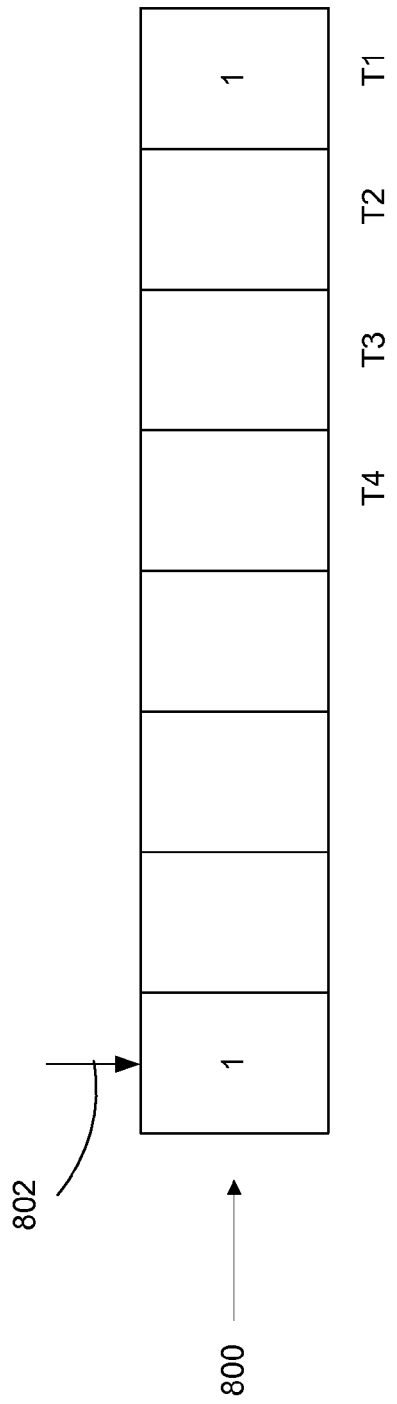

In some embodiments, a stream generator 104 may provide a tier assertion byte with a subfield set to provide an indication to a device as to whether the tier assertion byte is to be processed according to a increasing tier number approach from Tier 1 (FIG. 6) or a decreasing tier number approach (FIG. 7). For instance, referring to FIG. 8, shown is one example embodiment of a tier assertion byte 800 that includes tier levels $T_1$, $T_2$, $T_3$, and $T_4$ (with a subfield value for $T_1$) and further provides another subfield 802 with a value of "1" to convey the increasing tier number approach (FIG. 6) is the manner of processing. A value of "0" (or no value in some embodiments) for subfield 802 signals to a device that a decreasing tier number approach (FIG. 7) is the intended manner of processing. In some embodiments, one or more subfields may be ignored. Although illustrated in FIG. 8 as a subfield at the end of the tier assertion byte, or with only four possible tier levels, it should be understood in the context of the present disclosure that other locations for such an indication and/or numbers of tiers may be employed in some embodiments.

Figure 9:
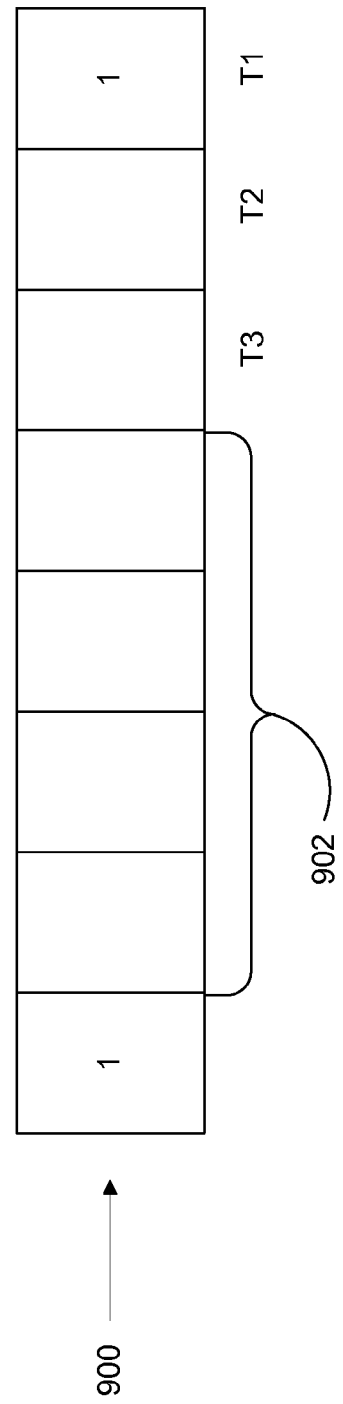

FIG. 9 is an example tier assertion byte 900 that includes one or more subfields with values used to identify a next picture belonging to the same tier level. Although shown as an added feature to the features present in the tier assertion byte 800, it should be appreciated that some embodiments may consist of, for instance, a tier assertion byte with plural tier levels according to a particular order (e.g., FIG. 6 or FIG. 7) and the remaining portion of the tier assertion byte dedicated to identifying the next picture, or some variation in between. In other words, the various embodiments of tier assertion bytes disclosed herein may be mixed and matched in some embodiments to provide multiple functionality, or configured in some embodiments to provide a singular functionality corresponding to the disclosed one of the features. In FIG. 9, the tier assertion byte 900 comprises subfields 902 with a value corresponding to either an identification (e.g., via relative location) of a next picture belonging to the same tier, or an indication that a next picture having the same tier number is not identified. Three tier levels are also shown in this example embodiment, but not limited to this quantity. In one embodiment, the identification may be embodied as a number of pictures away from the current picture (e.g., in increments of one or more pictures). If a next picture is not identified, the plural subfields may comprise an appropriate value (e.g., collectively 0000) to indicate to a device that a next picture is not identified in the current tier assertion byte 900. In some embodiments, fewer or greater numbers of flags (e.g., entries) may be dedicated to provide the identification.

FIG. 10 illustrates another embodiment of signaling related tier information that includes a data field that signals whether the corresponding picture issues an MMCO command. An example tier assertion byte 1000 has similar features to those shown for tier assertion byte 900, but with fewer subfields dedicated to the identification of the next picture belonging to the same tier and a subfield 1002 having a value of "1" to signal an assertion of whether an MMCO command is issued. That is, tier assertion byte 1000 comprises subfield 1002 that is asserted (set to a value of "1") to signal that an MMCO command is issued with the corresponding picture. In other words, the assertion of subfield 1002 results in the corresponding picture issuing an MMCO command, which in some embodiments marks a reference picture as "no longer needed for reference" in accordance to the AVC specification. A value of "0" (or no value in some embodiments) in subfield 1002 indicates that no MMCO command is issued in the corresponding picture.

Note that in some embodiments, the need for an MMCO command may not be needed in the tier assertion byte 1000. In other words, the absence of an MMCO command does not cause a reference picture used by a subsequent picture in the video stream to be bumped from the DPB.

An MMCO can only be issued by a reference picture in accordance with the AVC specification. However, a non-reference picture may enter the DPB if it has output time unequal or after to its decode time. In one embodiment, when a non-reference picture is required to enter the DPB. If an MMCO is needed to be issued concurrently with the decoding of the non-reference picture (i.e., in accordance with the AVC specification to mark at least one reference picture in the DPB as a non-reference picture), although not used as a reference picture, the non-reference picture is signaled as a reference picture to enable the picture to issue the MMCO. In this embodiment, tier information is signaled with the non-reference picture signaled as a reference picture and the related tier information also signals that this picture issues an MMCO.

In some embodiments, other information may be signaled in the transport stream. For instance, in one embodiment, an extra byte may be added (e.g., by stream generator 104) at an SRAP to convey the minimum number of independently decodable pictures per second, irrespective of trick mode speed. For instance, for tiers 1 to K, 3 bits as one example parameter.

In some embodiments, the existence of the assertion tier byte of minimum decodable picture (i.e., the assist information) may be signaled in the transport stream. In other words, a specific message carries the assist information. In some embodiments, an "announcement" may be provided that alerts devices or otherwise makes it known that a specific message carrying assist information or related tier information is present in the transport stream. For instance, the specific message carrying the assist information can be announced with a corresponding specific announcement through the ES information loop of the PMT. Such an announcement serves to simply identify that the transport stream contains the specific message that carries assist information. In one embodiment, the format of the specific message can be via an assigned message identification (e.g., a descriptor tag) and corresponding message length (e.g., a tag length). For instance, a descriptor tag may convey to a decoder that information of a particular type (e.g., corresponding to one of a plurality of tag values) is present in the transport stream Note that, though the above assist information is explained in the context of an AVC environment, MPEG-2 video, and in particular, MPEG-2 video GOPs are contemplated to be within the scope of the embodiments disclosed herein.

In some embodiments, such as embodiments that extend to the above embodiments discussing the tier assertion byte (or data field), when a picture of interlaced video is coded as two fields in two separate PES packets a bit of the tier assertion byte (or equally tier assertion field), may identify whether the field is a bottom or a top field with two respective values. In some embodiments, yet another field may identify the relative location (e.g., in number of fields away from the current field) of the field that corresponds to the current picture that is being asserted as belonging to a tier.

In some embodiments, the information provided is merely a tier assertion field (or a tier assertion field when more than one byte is used) that includes M bits corresponding to M respective tiers, where M is less than or equal to eight. The M bits are ordered to represent M respective tiers from lowest tier number to highest tier number. Only one of the M bits is allowed to have the first value (equal to "1") to assert the tier for the corresponding picture, which is the picture in the video stream associated with the location of the assertion flags field in the transport packet. For instance, similar to as described above, the tier assertion field may be provided in the adaptation field of the MPEG-2 Transport packet and the start of the header of the PES packet containing the corresponding picture may be located at the start of the payload of the same transport packet. Thus, a tier may be asserted for a single picture but not all pictures in the video stream need to be asserted. For instance, it may not be desirable or necessary to assert pictures belonging to middle tiers. In some embodiments, the picture associated with a RAP does not need to be asserted with the tier assertion byte since it can be assumed to belong to the lowest numbered tier, Tier 1. In some embodiments, when the tier assertion byte is not required to assert the tier of the RAP picture, the tier assertion byte can represent the number of pictures away from the RAP picture where the next Tier 1 picture is located in the video stream.

In some embodiments, a bit of the tier assertion byte is assigned to convey assertion of increasing tier number signaling or an assertion of decreasing tier number signaling. In other words, a first value (e.g., "1") asserts signaling that starts with Tier 1 and ascending tier numbers, and a second value an assertion of signaling that starts with the highest tier number and the successive decreasing integers.

In another embodiment, the tier assertion byte contains: (1) the bit to convey ascending or descending tier numbering, the M bits corresponding to M respective tiers (as just described), and the next picture field. The next picture field identifies the location of the picture in the video stream that belongs to the same tier in the hierarchy as the asserted tier for the current picture. If the next picture field equals zero, it does not identify the location of a picture. A non-zero value in the next picture field corresponds to the number of pictures in the video stream from the current picture, in transmission order, and, thus, identifies the next picture belonging to the same tier as the current picture.

In some embodiments, such as embodiments that extend to the above embodiments discussing the tier assertion byte (or field), when a picture of interlaced video is coded as two fields in two separate PES packets a bit of the tier assertion byte (or equally tier assertion field), may identify whether the field is a bottom or a top field with two respective values. In some embodiments, yet another field may identify the relative location (e.g., in number of fields away from the current field) of the field that corresponds to the current picture that is being asserted as belonging to a tier.

Figure 11A:
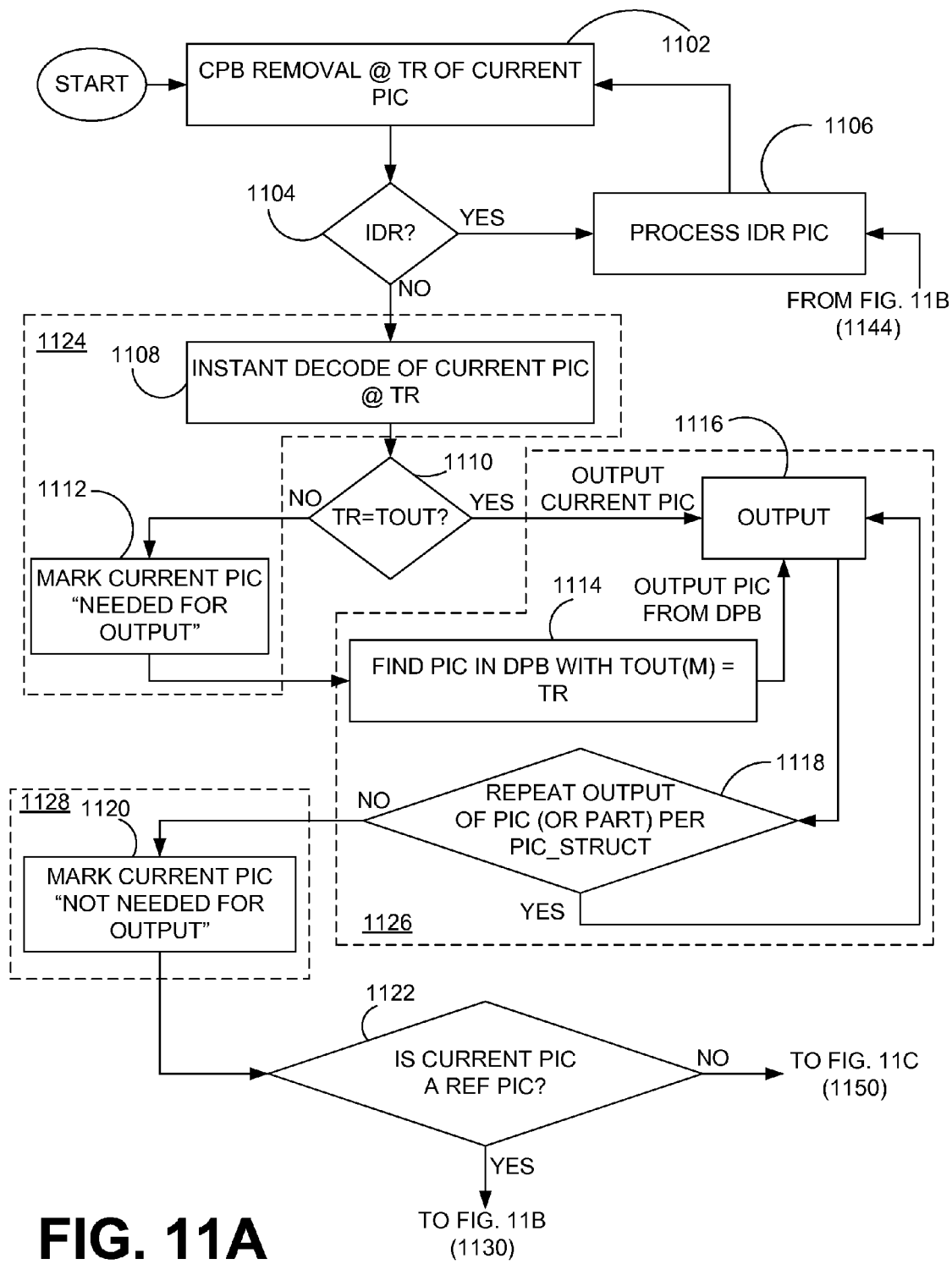
FIGS. 11A-11C are flow diagrams that collectively illustrate one embodiment for decoded picture buffer management including MMCO operations.
Figure 11B:
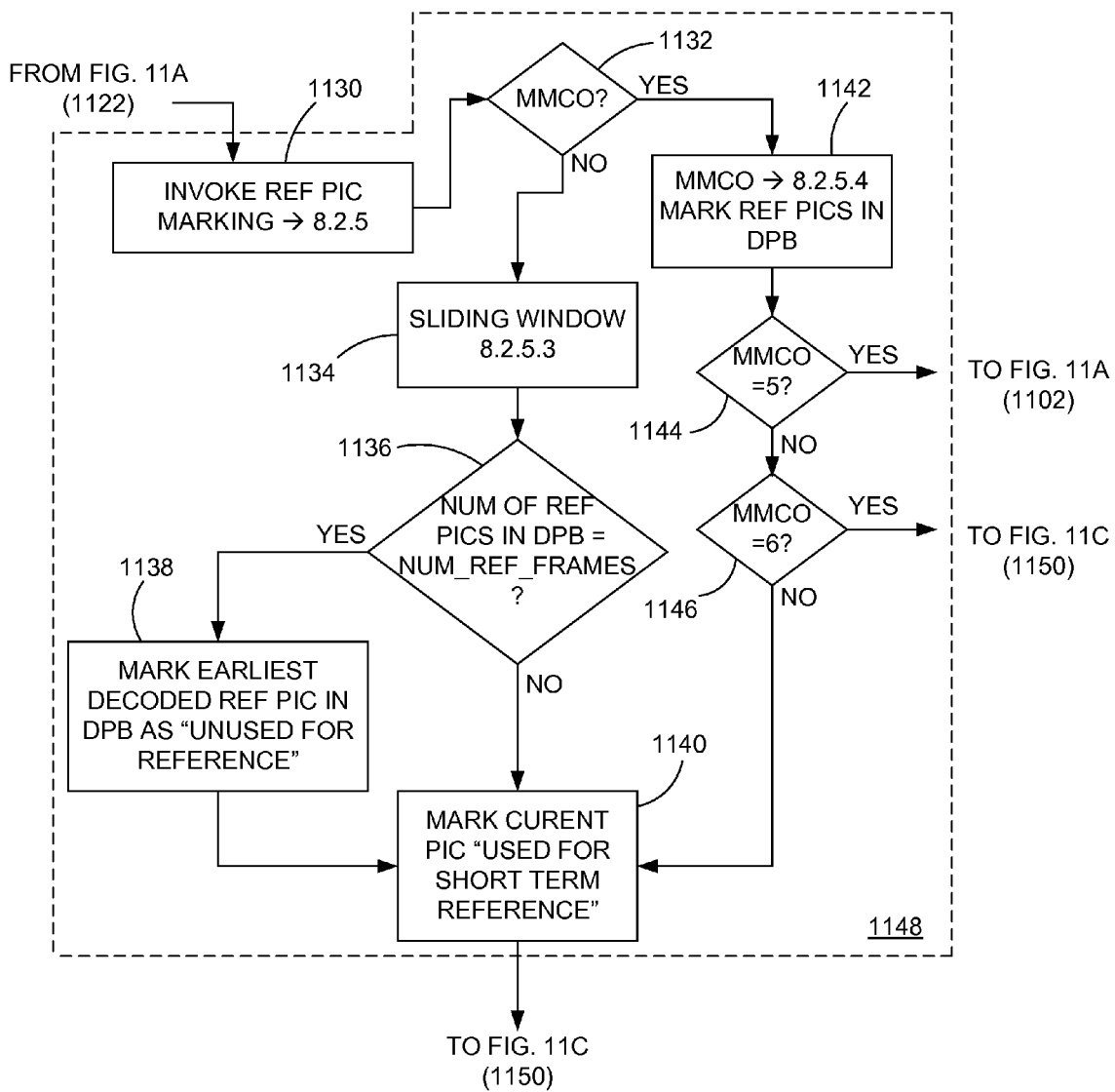
Figure 11C:
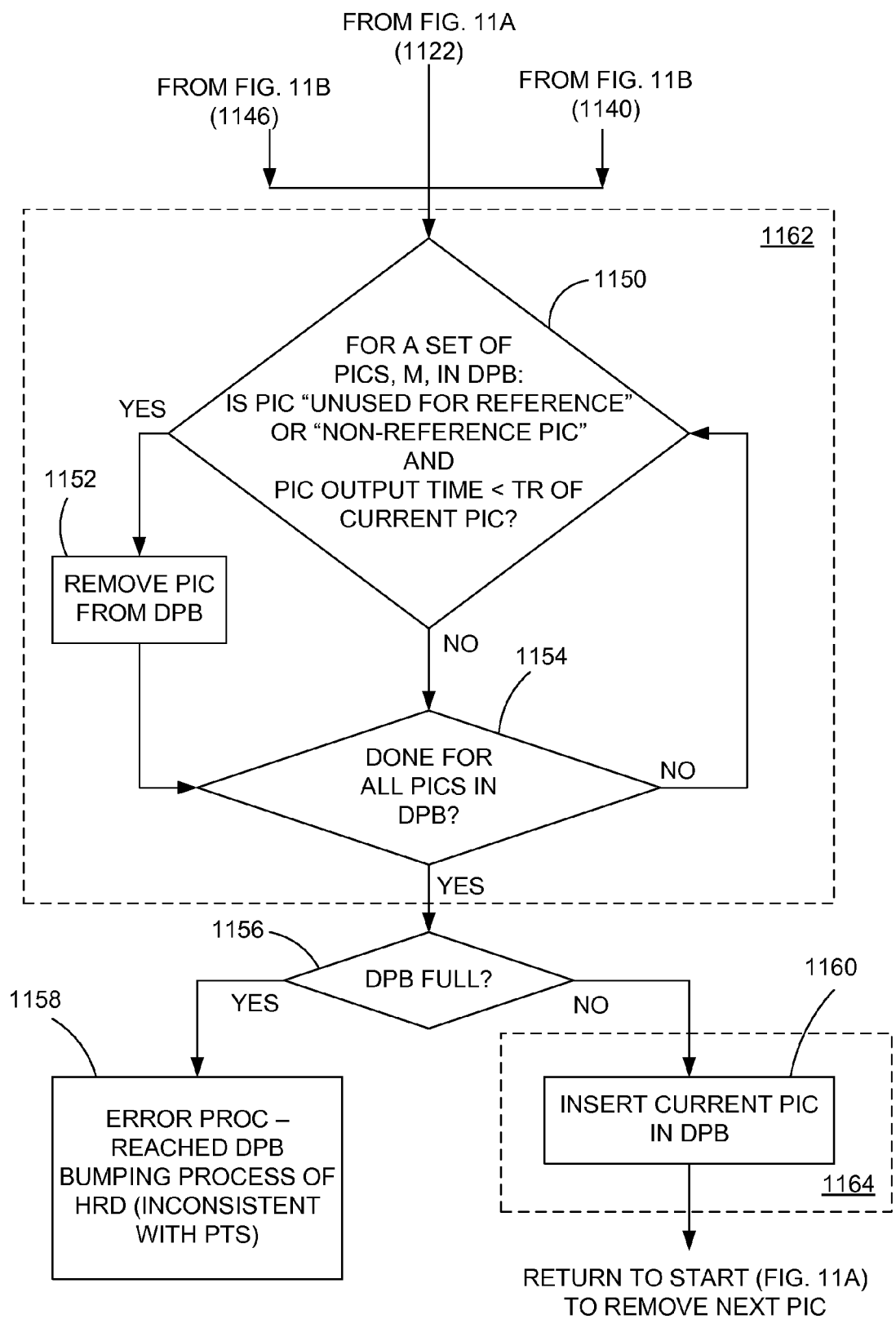

FIGS. 11A-11C provides an illustration of one example embodiment for DPB management and MMCO marking. An assumption is made that the process illustrated in FIGS. 11A-11C are based on a fixed frame rate (e.g., no gaps as specified in AVC) and valid for MPEG-2 Transport (e.g., ISO 13818-1 2007, which includes AVC transport), and with compliance of PTS and DTS as required by ISO 13818-1: 2007 (MPEG-2 Systems). As shown in FIG. 11A, a current picture is removed from the compressed picture buffer at $t_r$ (1102). At (1104), a decision is made whether the picture is an IDR picture. If so, the IDR picture is processed (1106) and processing returns to (1102). If not (at 1104), processing proceeds to the current picture decode block 1124, and in particular, an decoding of the current picture at $t_r$ (1108). A decision is made whether the decoded picture needs to be output in that picture output interval (i.e, whether $t_r = t_{out}$ (1110), and if not, the current picture is marked as "needed for output" (1112), and processing proceeds to picture output block 1126, where a picture to be output is found in the DPB with a $t_{out(m)} = t_r$ (114) and a picture is output from the DPB (1116)). If so (yes at 1110), the current picture is output (1116).

From the output (1116), processing proceeds to a decision as to whether to repeat output of picture (or part) per pic_structure (1118), and if so, output (1116), otherwise proceed to output picture marking block (1128) to mark the current picture as "not needed for output" (1112). From there, processing proceeds to a decision (1122) as to whether the current picture is a reference picture (e.g., is nal_ref_idc equal to zero or not equal to zero) and if not, proceed to FIG. 11C (1150), otherwise proceed to FIG. 11B (1130).

Proceeding to FIG. 11B (from 1122 in FIG. 11A), at reference picture marking block 1148, the reference picture marking process according to 8.2.5 (H.264) is invoked (1130) and a decision is made whether an MMCO (1132). If not, a sliding window process is implemented according to 8.2.5.3 (1134) and a decision is made (1136) as to whether the number of reference pictures in the DPB is equal to the num_ref_frames (i.e., maximum number of reference pictures allowed). If so, the earliest decoded reference picture in the DPB is marked as "unused for reference" (1138) and the current picture is marked as "used for short term reference" (1140) and processing proceeds to FIG. 11C (1150). If yes (to 1132), then MMCO is issued according to 8.2.5.4 to mark reference pictures in the DPB (1142) and determine if the MMCO has a value of 5 (1144) (if so, processing continues to FIG. 11A, 1102—equal to IDR processing with no_output_of_prior_pics_flag=0). If not (at 1144), then another determination (1146) is made as to whether MMCO has a value of 6 (if so, proceed to FIG. 11C, 1150). If not (at 1146), processing proceeds to 1140 and then FIG. 11C (1150) as explained above.

Referring to FIG. 11C, input to the removal of pictures from the DPB block 1162 is from sources 1146 (FIG. 11B), 1122 (FIG. 11A), and/or 1140 (FIG. 11B). At 1150, a decision is made as to whether, for a set of M pictures in the DPB, is a picture "unused for reference" or is it a "non-reference picture" and is the picture output time less than $t_r$ of the current picture. If so, remove the picture from the DPB (1152) and determine whether this has been done for all pictures in the DPB (1154) (if not, return to 1150). If the decision is no (at 1150), proceed to 1154 as explained above. If the outcome to 1154 is yes, proceed to a decision (1156) as to whether the DPB is full. If yes, then an error processing is invoked (1158—reached DPB bumping process of HRD—inconsistent with PTS). If not, processing proceeds to insertion of current picture in DPB block 1154, where the current picture is inserted in the DPB (1160) and processing returns to the start (at FIG. 11A).

Having described various embodiments that provide, receive, and/or process information conveyed in a transport stream, it should be appreciated that one method embodiment, referred to as method 1200 and illustrated in FIG. 12, comprises effecting the issuance by a first picture a memory management control operation (MMCO) during a first playback mode of a first video stream, the first picture processed but not decoded (1202); and processing and decoding the first picture of the first video stream during a second playback mode, wherein decompressing the first video stream the MMCO issued by the first picture affects referencing of a second picture that is a reference picture to a third picture, the first picture different than the second picture and the third picture, the second picture different than the first and the third picture (1204).

Another method embodiment, referred to herein as method 1300 and illustrated in FIG. 13, comprises providing tier information corresponding to a picture, the tier information provided in an adaptation field of a transport packet, the transport packet comprising a first byte of a header of a packetized elementary stream (PES) containing the picture (1302); and providing the first transport packet (1304). Any process descriptions or blocks in flow diagrams should be understood as representing modules, segments, or portions of code which include one or more executable instructions for implementing specific logical functions or steps in the process, and alternate implementations are included within the scope of the present disclosure in which functions may be executed out of order from that shown or discussed, including substantially concurrently or in reverse order, depending on the functionality involved, as would be understood by those reasonably skilled in the art. In some embodiments, additional steps may be implemented. Further, the methods described in the flow diagrams of FIGS. 11A-13 are not limited to the architectures or devices illustrated in FIGS. 1-2.

It should be emphasized that the above-described embodiments of the present disclosure are merely possible non-limiting examples of implementations, merely setting forth a clear understanding of the principles of the disclosed systems and method embodiments. Many variations and modifications may be made to the above-described embodiments, and all such modifications and variations are intended to be included herein within the scope of the disclosure and protected by the following claims.

We claim:

1. A method, comprising: determining a first tier number from a tier assertion field for a first picture received in an Advanced Video Coding (AVC) stream, wherein the encoded first picture includes a memory management control operation (MMCO), wherein decoding of a second picture depends on processing the MMCO, wherein the tier assertion field comprises a number of bits corresponding to a number of available tiers; effecting the issuance, by the first picture, of the MMCO during a first playback mode, the first picture processed but not decoded during the first playback mode; wherein the first picture is decoded during a second playback mode, the second playback mode different than the first playback mode, wherein the first picture comprises a first byte that conveys a minimum number of independently decodable pictures for a predetermined time irrespective of a second playback mode speed, and wherein the MMCO issued by the first picture affects referencing of the second picture by a third picture, the first picture different than the second picture and the third picture; and interpreting the first tier number based on which of the number of bits is set to a first value.

2. The method of claim 1, wherein the number of bits are ordered based on increasing or decreasing tier numbers.

3. The method of claim 1, wherein the tier assertion field is provided in an adaptation field.

4. The method of claim 1, wherein a tier assertion field is associated with some, but not all pictures in the AVC stream.

5. The method of claim 1, wherein a tier assertion field is not associated with a picture associated with a RAP.

6. The method of claim 1, wherein the tier assertion field comprises a tier assertion byte representing the number of pictures away from a RAP picture the first picture is.

7. The method of claim 2, wherein the tier assertion field comprises a tier assertion byte that conveys whether the number of bits are ordered based on increasing or decreasing tier numbers.

8. A method, comprising: providing a first tier number in a tier assertion field for a first picture in an Advanced Video Coding (AVC) stream, wherein the encoded first picture includes a memory management control operation (MMCO), wherein decoding of a second picture depends on processing the MMCO, wherein the tier assertion field comprises a number of bits corresponding to a number of available tiers; effecting the issuance by the first picture, of the MMCO during a first playback mode, wherein the first picture is processed but not decoded during the first playback mode, wherein the first picture is decoded during a second playback mode, the second playback mode different than the first playback mode, wherein the first picture comprises a first byte that conveys a minimum number of independently decodable pictures for a predetermined time irrespective of a second playback mode speed, and wherein the MMCO issued by the first picture affects referencing of the second picture by a third picture, the first picture different than the second picture and the third picture; and providing the AVC stream.

9. The method of claim 8, wherein an assertion tier byte is provided in the tier assertion field.

10. The method of claim 9, wherein the assertion tier byte is signaled by a message announced through an elementary stream information loop.

11. The method of claim 10, wherein the message is assigned via an assigned message descriptor tag.

12. The method of claim 11, wherein the descriptor tag conveys that information corresponding to one of a plurality of tag values is present in the elementary stream.

13. A system, comprising: a memory: a processor coupled to the memory, wherein the processor is configured to: determine a first tier number from a tier assertion field for a first picture received in an Advanced Video Coding (AVC) stream, wherein the encoded first picture includes a memory management control operation (MMCO), wherein decoding of a second picture depends on processing the MMCO, wherein the tier assertion field comprises a number of bits corresponding to a number of available tiers; effect the issuance, by the first picture, of the MMCO during a first playback mode, wherein the first picture is processed but not decoded during the first playback mode, wherein the first picture is decoded during a second playback mode, the second playback mode different than the first playback mode, wherein the first picture comprises a first byte that conveys a minimum number of independently decodable pictures for a predetermined time irrespective of a second playback mode speed, and wherein the MMCO issued by the first picture affects referencing of the second picture by a third picture, the first picture different than the second picture and the third picture; and interpret the first tier number based on which of the number of bits is set to a first value.

14. The system of claim 13, wherein the tier assertion field further comprises a tier assertion byte, the tier assertion byte comprising a subfield that signals whether the MMCO should be issued.

15. The system of claim 14, wherein a first portion of the tier assertion byte comprises plural tier levels according to a particular order.

16. The system of claim 14, wherein a second portion of the tier assertion byte is dedicated to identifying the second picture.

17. The system of claim 14, wherein the subfield comprises a value corresponding to a relative location of the second picture.

18. The system of claim 14, wherein the subfield indicates that the second picture is not identified by the tier assertion byte.

19. The system of claim 14, wherein the subfield indicates whether the number of bits are ordered based on increasing or decreasing tier numbers.

20. The system of claim 13, wherein processor is contained in a set-top box.

* * * * *